United States Patent
Soneda et al.

(10) Patent No.: US 9,912,779 B2
(45) Date of Patent: Mar. 6, 2018

(54) COMMUNICATION METHOD AND NODE DEVICE FOR COMMUNICATION BETWEEN ADJACENT CLUSTERS

(71) Applicant: FUJITSU LIMITED, Kawasaki-shi, Kanagawa (JP)

(72) Inventors: Tatsuya Soneda, Fukuoka (JP); Tetsu Yamamoto, Kawasaki (JP); Norihito Nishimoto, Fukuoka (JP); Tadashige Iwao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 14/820,657

(22) Filed: Aug. 7, 2015

(65) Prior Publication Data

US 2015/0350374 A1 Dec. 3, 2015

Related U.S. Application Data

(63) Continuation of application No. PCT/JP2013/059650, filed on Mar. 29, 2013.

(51) Int. Cl.
*H04L 29/08* (2006.01)
*G06F 11/20* (2006.01)
(Continued)

(52) U.S. Cl.
CPC .......... *H04L 67/32* (2013.01); *G06F 11/2033* (2013.01); *H04L 67/10* (2013.01);
(Continued)

(58) Field of Classification Search
None
See application file for complete search history.

(56) References Cited

U.S. PATENT DOCUMENTS

| 7,450,553 B2* | 11/2008 | Park ............... H04W 74/006 370/338 |
| 8,422,481 B2* | 4/2013 | Hanuni ........... H04W 72/0406 370/348 |

(Continued)

FOREIGN PATENT DOCUMENTS

| JP | 2008-283360 | 11/2008 |
| JP | 2008-312059 | 12/2008 |

(Continued)

OTHER PUBLICATIONS

International Search Report and Written Opinion of the International Searching Authority (Form PCT/ISA/210, Form PCT/ISA/237), mailed in connection with PCT/JP2013/059650 and dated Jul. 2, 2013 (8 pages).

(Continued)

*Primary Examiner* — Ayaz Sheikh
*Assistant Examiner* — Faiyazkhan Ghafoerkhan
(74) *Attorney, Agent, or Firm* — Fujitsu Patent Center

(57) ABSTRACT

A selection device is selected from a first group in a first cluster. The node devices of the first group can communicate with a node device in a second cluster adjacent to the first cluster. The selection device performs transmission and reception of a report frame that reports an identifier of a node device included in the first group. The selection device selects from the first group a first relay device that relays a relay frame used for a communication between a node device in the first cluster and a node device in the second cluster. The first relay device determines anode device adjacent to the first relay device to be a second relay device that relays the relay frame to a node device in the second cluster.

16 Claims, 51 Drawing Sheets

(51) Int. Cl.
*H04W 40/02* (2009.01)
*H04W 88/04* (2009.01)
(52) U.S. Cl.
CPC ........... *H04W 40/02* (2013.01); *H04W 88/04* (2013.01); *G06F 2201/85* (2013.01)

(56) References Cited

U.S. PATENT DOCUMENTS

| | | | |
|---|---|---|---|
| 2003/0041150 A1* | 2/2003 | Passman | H04L 45/04 709/227 |
| 2004/0233847 A1* | 11/2004 | Park | H04L 45/00 370/235 |
| 2005/0041676 A1* | 2/2005 | Weinstein | H04L 45/02 370/401 |
| 2006/0029007 A1* | 2/2006 | Ayyagari | H04L 45/02 370/310 |
| 2007/0299950 A1* | 12/2007 | Kulkarni | H04L 45/00 709/223 |
| 2008/0261580 A1* | 10/2008 | Wallentin | H04L 41/0893 455/418 |
| 2008/0268855 A1* | 10/2008 | Hanuni | H04W 72/0406 455/445 |
| 2009/0003214 A1* | 1/2009 | Vaswani | H04L 45/00 370/236 |
| 2009/0290511 A1* | 11/2009 | Budampati | H04J 3/0641 370/254 |
| 2009/0290572 A1* | 11/2009 | Gonia | H04J 3/0641 370/350 |
| 2010/0238855 A1* | 9/2010 | Yoshida | H04B 7/155 370/315 |
| 2012/0163177 A1* | 6/2012 | Vaswani | H04L 45/00 370/236 |
| 2013/0291068 A1* | 10/2013 | Huang | G06F 9/5072 726/4 |
| 2014/0198770 A1 | 7/2014 | Yamamoto et al. | |

FOREIGN PATENT DOCUMENTS

| | | |
|---|---|---|
| JP | 2009-508434 | 2/2009 |
| JP | 2009-159113 | 7/2009 |
| JP | 2010-278892 | 12/2010 |
| WO | 2007/032713 | 3/2007 |
| WO | 2013/042208 | 3/2013 |

OTHER PUBLICATIONS

Ashish Bagwari et al., "Cluster Head Gateway approach using in Integrated Mobile Ad hoc Network", Recent Advances in Intelligent Computational Systems (RAICS), 2011 IEEE, Sep. 24, 2011, pp. 652-655 (5 pages).
Chinese Office Action dated Dec. 1, 2017 for corresponding Chinese Patent Application No. 201380073933.7, with English Translation, 21 pages.

* cited by examiner

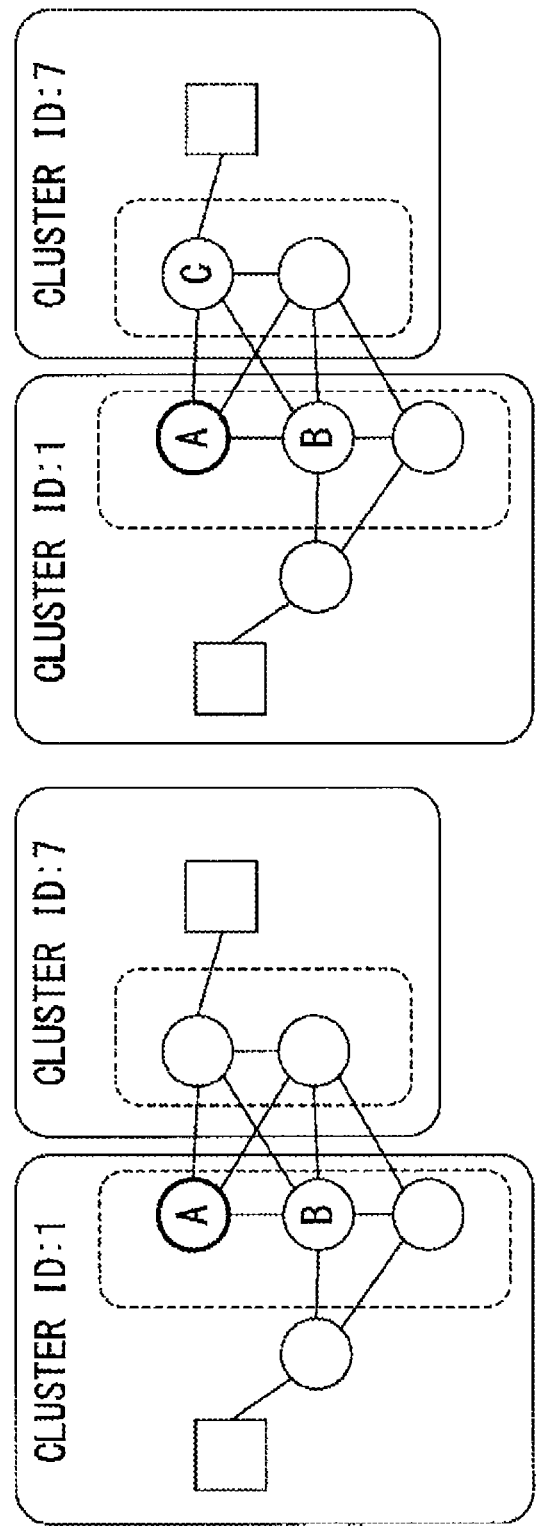
F I G. 2B
F I G. 2A

| Type | GD | GS | LS | LD | CI | MCI | CCNT | ROUTE INFORMATION |

F I G. 3

| ADJACENT CLUSTER ID [CID] | SGW NODE (SLAVE) | SGW CANDIDATE (SLAVE) | | LEADER NODE | | SGW NODE (MASTER) | | | SGW CANDIDATE (MASTER) | |
|---|---|---|---|---|---|---|---|---|---|---|
| | NODE ID [SID] | NODE ID [SSID] | CLUSTER COUNT [SCNT] | NODE ID [LID] | SEQUENCE NUMBER [LIDSN] | NODE ID [MGW] | SEQUENCE NUMBER [SGWSN] | CLUSTER COUNT [SGWCNT] | NODE ID [CSID] | CLUSTER COUNT [CSCNT] |
| CID1 | SID1 | SSID1 | SCNT1 | LID1 | LIDSN1 | MGW1 | SGWCNT1 | SGWCNT1 | CSID1 | CSCNT1 |
| CID2 | SID2 | SSID2 | SCNT2 | LID2 | LIDSN2 | MGW2 | SGWCNT2 | SGWCNT2 | CSID2 | CSCNT2 |
| CIDn | SIDn | SSIDn | SCNTn | LIDn | LIDSNn | MGWn | SGWCNTn | SGWCNTn | CSIDn | CSCNTn |

B

| SLAVE CLUSTER ID [CID] | SLAVE SGW | MASTER LEADER | | MASTER SGW | | | MASTER SGW CANDIDATE | |
|---|---|---|---|---|---|---|---|---|
| | NODE ID [SID] | NODE ID [LID] | SEQUENCE NUMBER [LIDSN] | NODE ID [MGW] | SEQUENCE NUMBER [SGWSN] | CLUSTER COUNT [SGWCNT] | NODE ID [CSID] | CLUSTER COUNT [CSCNT] |

A

F I G. 6

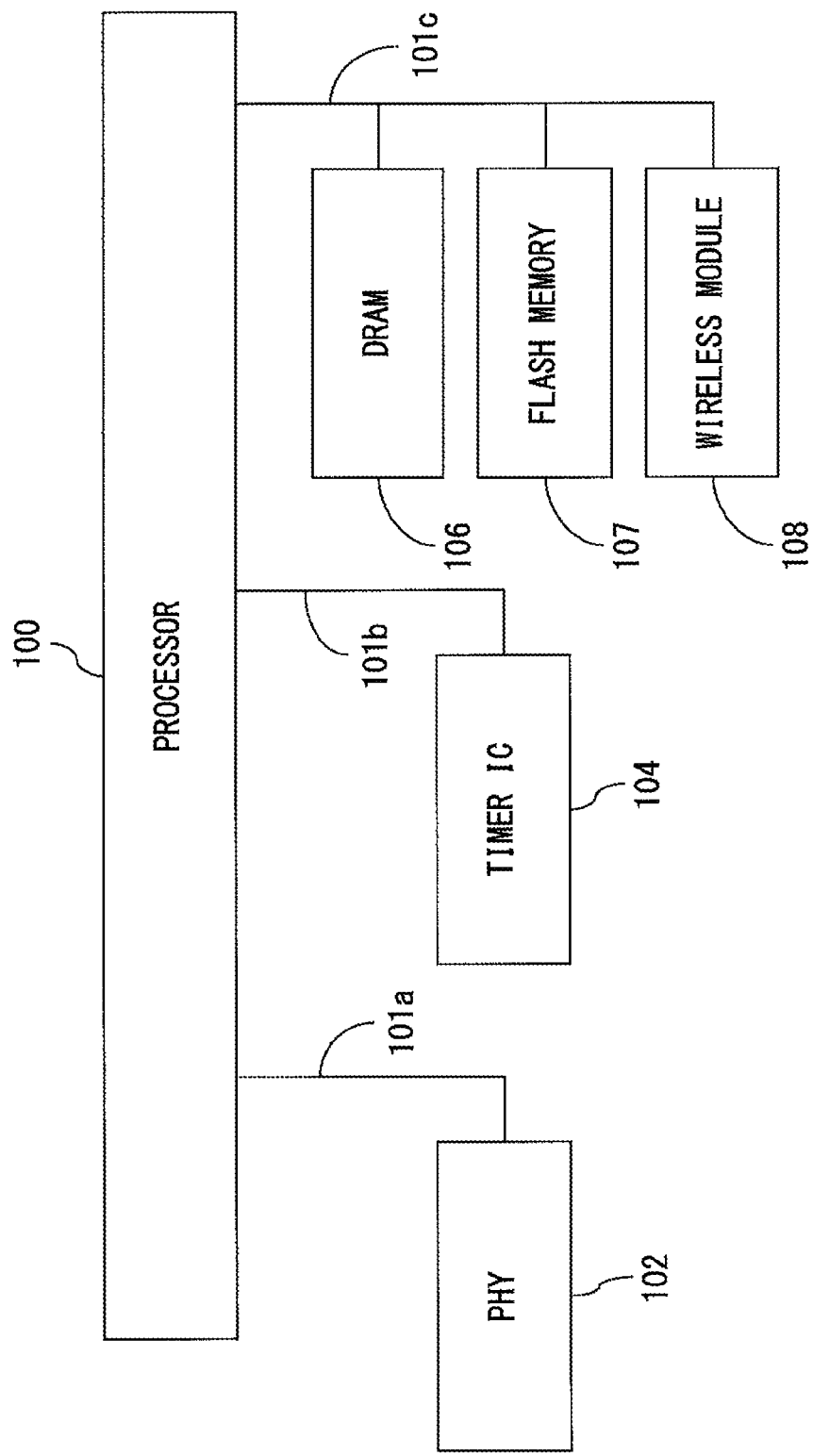
F I G. 7

FIG. 10A

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (GSID) | CLUSTER COUNT (CSCNT) |
| C7 | N6 | N6 | 0 | N3 | 0 | N3 | 0 | 1 | null | 0 |

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | N6 | 0 | N5 | 0 | N5 | 0 | 1 | null | 0 |

53_3

| ADJACENT CLUSTER ID (CID) | SGW NODE (SLAVE) | SGW CANDIDATE (SLAVE) | LEADER NODE (MASTER) | | SGW NODE (MASTER) | | SGW CANDIDATE (MASTER) | |
|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (GSCNT) |
| C7 | N6 | N6 | 0 | N3 | 1 | N3 | 1 | 1 | null | 0 |

| MASTER CLUSTER ID (CID) | MASTER SGW (SID) |
|---|---|
| C1 | N3 |

54_10

| MASTER CLUSTER ID (CID) | MASTER SGW (SID) |
|---|---|
| C1 | null |

53_13

| ADJACENT CLUSTER ID (CID) | SGW NODE (SLAVE) | | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|---|
| | NODE ID (NID) | | NODE ID (SSID) | CLUSTER COUNT (SGNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | | N8 | 1 | N3 | 1 | N3 | 1 | 1 | null | 0 |

F I G. 1 1

F I G. 1 2 A

53_14

| ADJACENT CLUSTER ID (GID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N8 | N8 | 1 | N4 | 0 | N4 | 0 | 1 | null | 0 |

| ADJACENT CLUSTER ID (GID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| G7 | N8 | N8 | 1 | N3 | 1 | N3 | 1 | 1 | null | 0 |

| MASTER CLUSTER ID (CID) | MASTER SGW (SID) |
|---|---|
| C1 | N4 |

FIG. 13A

| ADJACENT CLUSTER ID (CID) | SGW NODE (SLAVE) NODE ID (NID) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | N6 | 1 | N3 | 1 | N3 | 1 | 1 | null | 0 |

53_24

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | N6 | 1 | N3 | 1 | N3 | 1 | 1 | null | 0 |

53_25

F I G. 13B

| ADJACENT CLUSTER ID (CID) | SGW NODE (SLAVE) | SGW CANDIDATE (SLAVE) | | LEADER NODE (MASTER) | | SGW NODE (MASTER) | | SGW CANDIDATE (MASTER) | |
|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | N8 | 1 | N3 | 2 | N3 | 2 | 1 | null | 0 |

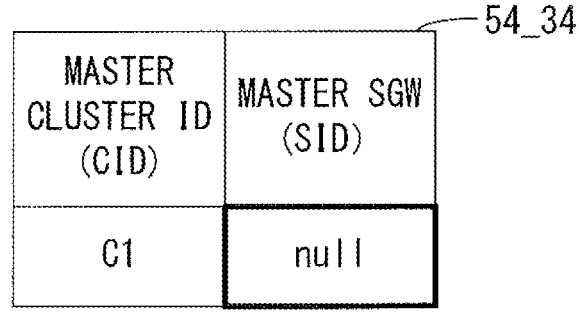
F I G. 1 4

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | N6 | 1 | N3 | 2 | N3 | 2 | 1 | null | 0 |

F I G. 1 6 A

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | N6 | 1 | N3 | 2 | N3 | 2 | 1 | null | 0 |

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (GSCNT) |
| C7 | N6 | N8 | 1 | N3 | 2 | N3 | 2 | 1 | null | 0 |

| ADJACENT CLUSTER ID (GID) | SGW NODE (SLAVE) NODE ID (NID) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | N8 | 1 | N3 | 2 | N3 | 2 | 1 | N4 | 2 |
| C9 | N9 | N9 | 1 | N4 | 0 | N4 | 0 | 2 | null | 0 |

F I G. 17A

F I G. 17B

| MASTER CLUSTER ID (CID) | MASTER SGW (SID) |
|---|---|
| C1 | N4 |

F I G. 17C

| | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| ADJACENT CLUSTER ID (CID) | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N6 | N6 | 1 | N3 | 2 | N4 | 3 | 2 | null | 0 |

| ADJACENT CLUSTER ID (CID) | SGW NODE (SLAVE) NODE ID (NID) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (GSID) | CLUSTER COUNT (GSCNT) |
| C7 | N8 | N8 | 1 | N3 | 3 | N4 | 3 | 2 | null | 0 |
| C9 | N9 | N9 | 1 | N4 | 1 | N4 | 1 | 2 | null | 0 |

FIG. 18A

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (GSID) | CLUSTER COUNT (GSCNT) |
| C7 | N6 | N6 | 1 | N3 | 3 | N4 | 3 | 2 | null | 0 |

F I G. 18 B

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N8 | N6 | 1 | N3 | 3 | N4 | 4 | 2 | null | 0 |

FIG. 19A

| ADJACENT CLUSTER ID (CID) | SGW NODE (SLAVE) | SGW CANDIDATE (SLAVE) | | LEADER NODE (MASTER) | | SGW NODE (MASTER) | | | SGW CANDIDATE (MASTER) | |
|---|---|---|---|---|---|---|---|---|---|---|
| | NODE ID (NID) | NODE ID (SSID) | CLUSTER COUNT (SCNT) | NODE ID (LID) | SEQUENCE NUMBER (LIDSN) | NODE ID (MGW) | SEQUENCE NUMBER (SGWSN) | CLUSTER COUNT (SGWCNT) | NODE ID (CSID) | CLUSTER COUNT (CSCNT) |
| C7 | N8 | N6 | 1 | N3 | 4 | N4 | 4 | 2 | null | 0 |

FIG. 19B

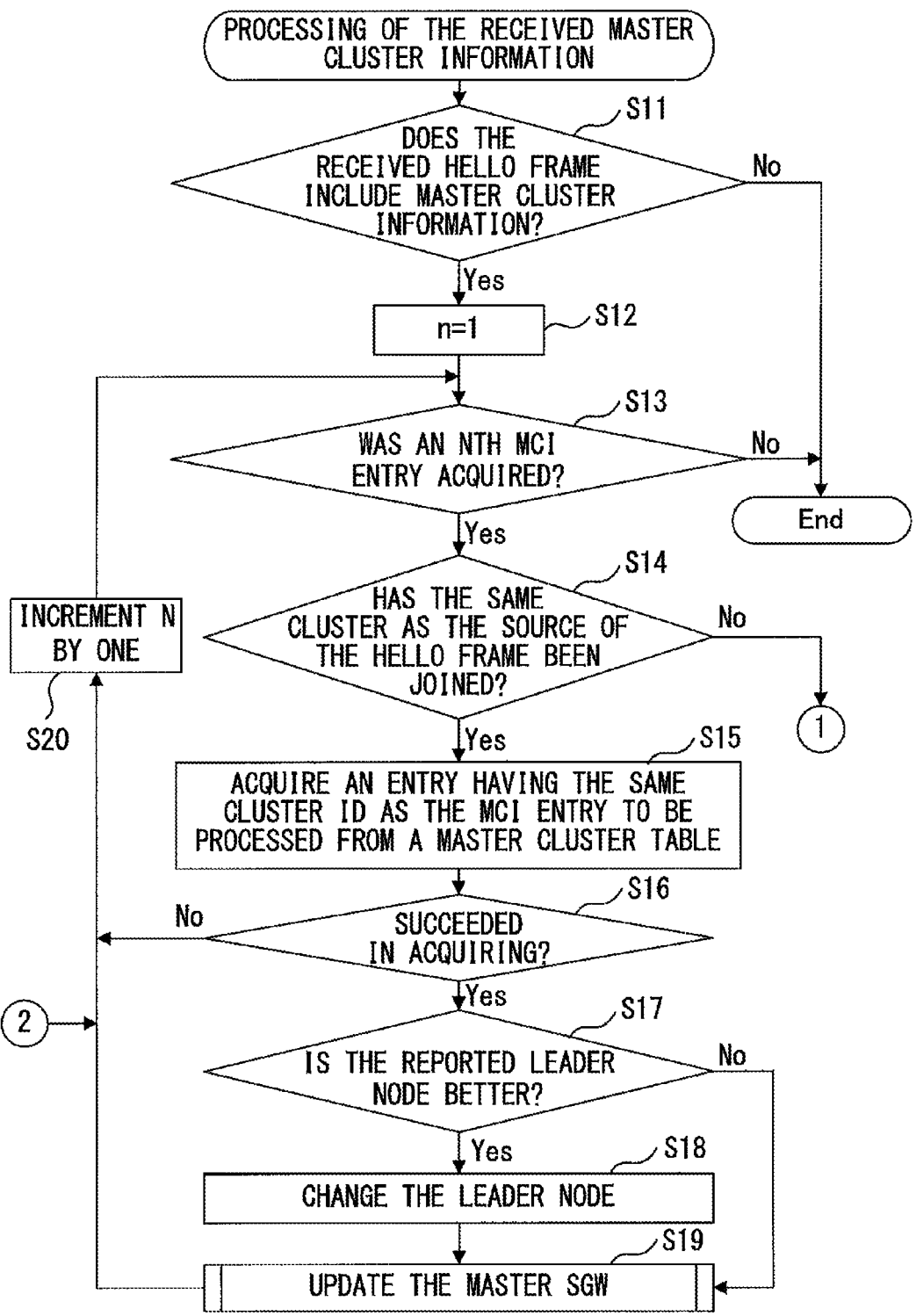
F I G. 2 1 A

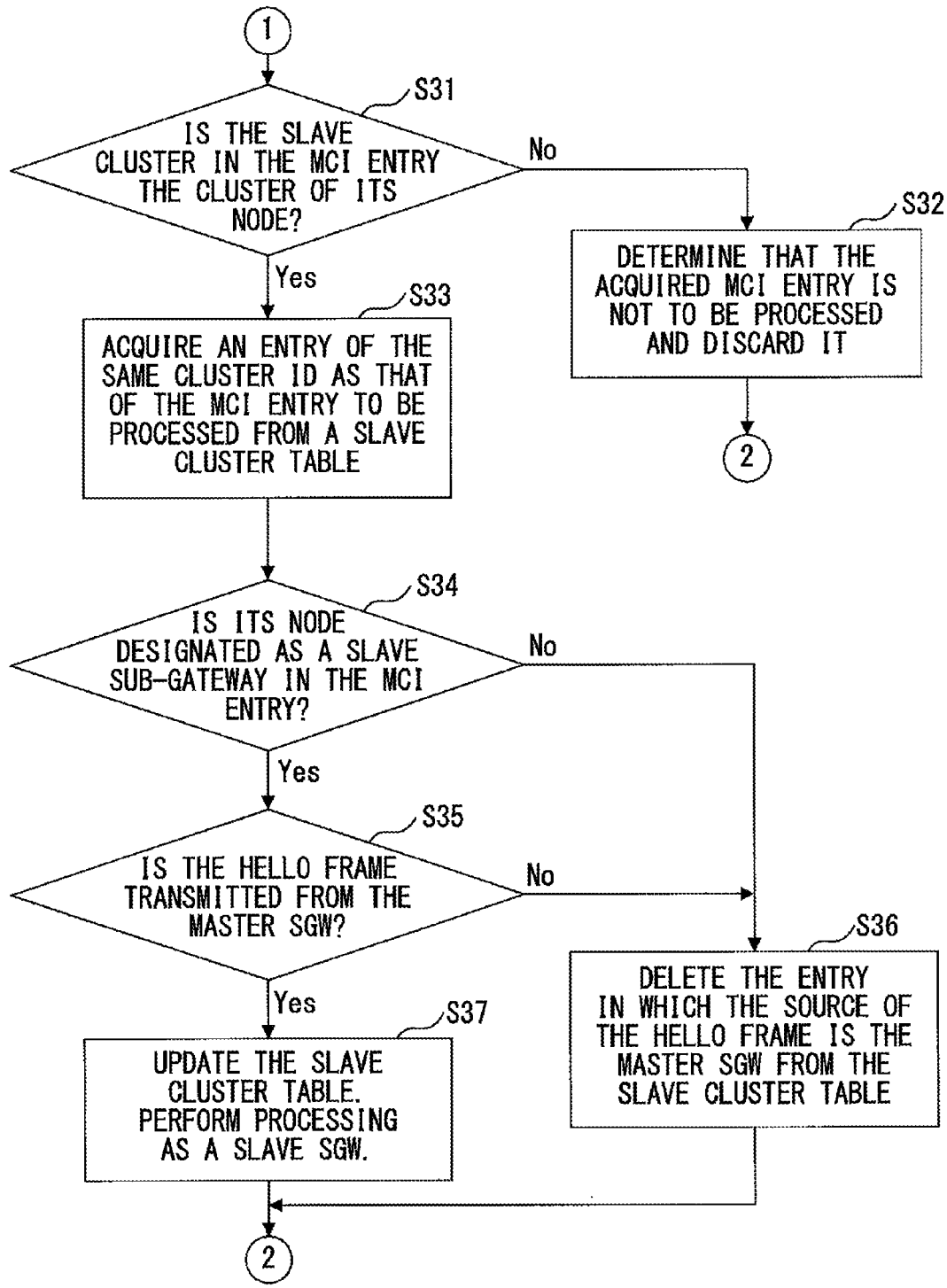
F I G. 2 1 B

| TYPE | GLOBAL DESTINATION ADDRESS | GLOBAL SOURCE ADDRESS | LOCAL DESTINATION ADDRESS | LOCAL SOURCE ADDRESS | DATA |
|---|---|---|---|---|---|
| | | DATA FRAME | | | |

F I G. 24A

| SGW INFORMATION | TYPE | GLOBAL DESTINATION ADDRESS | GLOBAL SOURCE ADDRESS | LOCAL DESTINATION ADDRESS | LOCAL SOURCE ADDRESS | DATA |
|---|---|---|---|---|---|---|
| DESTINATION SGW ADDRESS | | | DATA FRAME | | | |

F I G. 24B

| ADJACENT CLUSTER ID [CID] | SGW NODE (SLAVE) | | SGW CANDIDATE (SLAVE) | | LEADER NODE | | | SGW NODE (MASTER) | | | | SGW CANDIDATE (MASTER) | |
|---|---|---|---|---|---|---|---|---|---|---|---|---|---|
| | NODE ID [SID] | TTL [SIDTTL] | NODE ID [SSID] | CLUSTER COUNT [SCNT] | NODE ID [LID] | SEQUENCE NUMBER [LIDSN] | TTL [LIDTTL] | NODE ID [MGW] | SEQUENCE NUMBER [SGWSN] | CLUSTER COUNT [SGWCNT] | TTL [SGWTTL] | NODE ID [CSID] | CLUSTER COUNT [CSCNT] |
| CID1 | SID1 | SIDTTL1 | SSID1 | SCNT1 | LID1 | LIDSN1 | LIDTTL1 | MGW1 | SGWSN1 | SGWCNT1 | SGWTTL1 | CSID1 | CSCNT1 |
| CID2 | SID2 | SIDTTL2 | SSID2 | SCNT2 | LID2 | LIDSN2 | LIDTTL2 | MGW2 | SGWSN2 | SGWCNT2 | SGWTTL2 | CSID2 | CSCNT2 |
| CIDn | SIDn | SIDTTLn | SSIDn | SCNTn | LIDn | LIDSNn | LIDTTLn | MGWn | SGWSNn | SGWCNTn | SGWTTLn | CSIDn | CSCNTn |

61

F I G. 2 5

| MASTER CLUSTER ID [CID] | MASTER CLUSTER TTL [CTTL] | MASTER SGW NODE ID [SID1] | MASTER SGW TTL [STTL] |
|---|---|---|---|
| | | [SID2] | [STTL2] |
| | | | |
| | | [SIDk] | [STTLk] |
| CID1 | CTTL1 | SID11 | STTL11 |
| | | SID21 | STTL21 |
| | | | |
| | | SIDk1 | STTLk1 |
| CID2 | CTTL2 | SID12 | STTL12 |
| | | SID22 | STTL22 |
| | | | |
| | | SIDk2 | STTLk2 |
| CIDm | CTTLm | SID1m | STTL1m |
| | | SID2m | STTL2m |
| | | | |
| | | SIDkm | STTLkm |

F I G. 2 6

| ADJACENT CLUSTER ID [CID] | SGW NODE (SLAVE) | | SGW CANDIDATE (SLAVE) | | LEADER NODE | | | | SGW NODE (MASTER) | | | | SGW CANDIDATE (MASTER) | |
|---|---|---|---|---|---|---|---|---|---|---|---|---|---|---|
| | NODE ID [SID] | TTL [SIDTTL] | NODE ID [SSID] | CLUSTER COUNT [SCNT] | NODE ID [LID] | SEQUENCE NUMBER [LIDSN] | TTL [LIDTTL] | NODE ID [MGW] | SEQUENCE NUMBER [SGWSN] | CLUSTER COUNT [SGWCNT] | TTL [SGWTTL] | NODE ID [CSID] | CLUSTER COUNT [CSCNT] |
| 7 | 8 | SIDTTL1 | 8 | 1 | 3 | LIDSN1 | LIDTTL1 | 4 | SGWSN1 | 2 | SGWTTL1 | 0 | 0 |
| 9 | 9 | SIDTTL2 | 9 | 1 | 4 | LIDSN2 | LIDTTL2 | 4 | SGWSN2 | 2 | SGWTTL2 | 0 | 0 |

F I G. 2 8 A

| ADJACENT CLUSTER ID [CID] | SGW NODE (SLAVE) | | SGW CANDIDATE (SLAVE) | | LEADER NODE | | | SGW NODE (MASTER) | | | | SGW CANDIDATE (MASTER) | |
|---|---|---|---|---|---|---|---|---|---|---|---|---|---|
| | NODE ID [SID] | TTL [SIDTTL] | NODE ID [SSID] | CLUSTER COUNT [SCNT] | NODE ID [LID] | SEQUENCE NUMBER [LIDSN] | TTL [LIDTTL] | NODE ID [MGW] | SEQUENCE NUMBER [SGWSN] | CLUSTER COUNT [SGWCNT] | TTL [SGWTTL] | NODE ID [CSID] | CLUSTER COUNT [CSCNT] |
| 7 | 8 | 0 | 8 | 1 | 3 | LIDSN1 | LIDTTL1 | 4 | SGWSN1 | 2 | SGWTTL1 | 0 | 0 |

F I G. 2 8 B

| ADJACENT CLUSTER ID [CID] | SGW NODE (SLAVE) | | SGW CANDIDATE (SLAVE) | | LEADER NODE | | | SGW NODE (MASTER) | | | SGW CANDIDATE (MASTER) | |
|---|---|---|---|---|---|---|---|---|---|---|---|---|
| | NODE ID [SID] | TTL [SIDTTL] | NODE ID [SSID] | CLUSTER COUNT [SGNT] | NODE ID [LID] | SEQUENCE NUMBER [LIDSN] | TTL [LIDTTL] | NODE ID [MGW] | SEQUENCE NUMBER [SGWSN] | CLUSTER COUNT [SGWCNT] | TTL [SGWTTL] | NODE ID [CSID] | CLUSTER COUNT [CSCNT] |
| 7 | 8 | 0 | 8 | 1 | 3 | LIDSN1 | LIDTTL1 | 4 | SGWSN1 | 2 | SGWTTL1 | 0 | 0 |

F I G. 2 8 C

| ADJACENT CLUSTER ID [CID] | SGW NODE (SLAVE) | | SGW CANDIDATE (SLAVE) | | LEADER NODE | | | SGW NODE (MASTER) | | | SGW CANDIDATE (MASTER) | |
|---|---|---|---|---|---|---|---|---|---|---|---|---|
| | NODE ID [SID] | TTL [SIDTTL] | NODE ID [SSID] | CLUSTER COUNT [SCNT] | NODE ID [LID] | SEQUENCE NUMBER [LIDSN] | TTL [LIDTTL] | NODE ID [MGW] | SEQUENCE NUMBER [SGWSN] | CLUSTER COUNT [SGWCNT] | TTL [SGWTTL] | NODE ID [GSID] | CLUSTER COUNT [GSGNT] |
| 9 | 9 | SIDTTL2 | 9 | 1 | 4 | LIDSN2 | LIDTTL2 | 4 | SGWSN2 | 2 | SGWTTL2 | 0 | 0 |

F I G. 29A

| ADJACENT CLUSTER ID [CID] | SGW NODE (SLAVE) | | SGW CANDIDATE (SLAVE) | | LEADER NODE | | | SGW NODE (MASTER) | | | | SGW CANDIDATE (MASTER) | |
|---|---|---|---|---|---|---|---|---|---|---|---|---|---|
| | NODE ID [SID] | TTL [SIDTTL] | NODE ID [SSID] | CLUSTER COUNT [SCNT] | NODE ID [LID] | SEQUENCE NUMBER [LIDSN] | TTL [LIDTTL] | NODE ID [MGW] | SEQUENCE NUMBER [SGWSN] | CLUSTER COUNT [SGWCNT] | TTL [SGWTTL] | NODE ID [CSID] | CLUSTER COUNT [CSCNT] |
| 7 | 6 | SIDTTL1 | 6 | 1 | 3 | LIDSN1 | LIDTTL1 | 3 | SGWSN1 | 1 | SGWTTL1 | 0 | 0 |

F I G. 29B

| ADJACENT CLUSTER ID [CID] | SGW NODE (SLAVE) | | SGW CANDIDATE (SLAVE) | | LEADER NODE | | | SGW NODE (MASTER) | | | | SGW CANDIDATE (MASTER) | |
|---|---|---|---|---|---|---|---|---|---|---|---|---|---|
| | NODE ID [SID] | TTL [SIDTTL] | NODE ID [SSID] | CLUSTER COUNT [SCNT] | NODE ID [LID] | SEQUENCE NUMBER [LIDSN] | TTL [LIDTTL] | NODE ID [MGW] | SEQUENCE NUMBER [SGWSN] | CLUSTER COUNT [SGWCNT] | TTL [SGWTTL] | NODE ID [CSID] | CLUSTER COUNT [CSCNT] |
| 7 | 6 | SIDTTL1 | 6 | 1 | 3 | LIDSN1 | LIDTTL1 | 3 | SGWSN1 | 1 | SGWTTL1 | 0 | 0 |

FIG. 29C

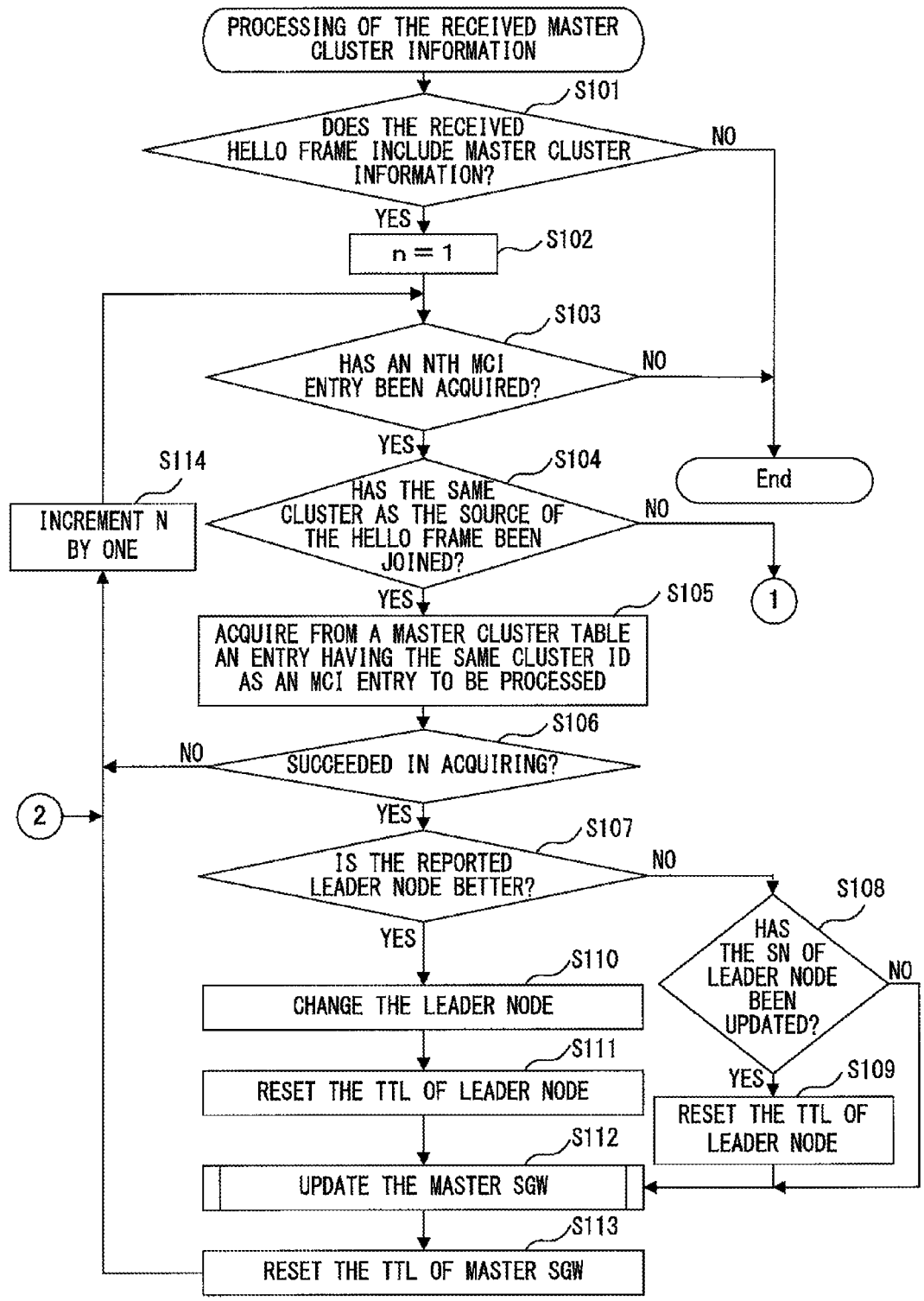
F I G. 3 2 A

COMMUNICATION METHOD AND NODE DEVICE FOR COMMUNICATION BETWEEN ADJACENT CLUSTERS

CROSS-REFERENCE TO RELATED APPLICATION

This application is a continuation application of International Application PCT/JP2013/059650 filed on Mar. 29, 2013 and designated the U.S., the entire contents of which are incorporated herein by reference.

FIELD

The embodiments discussed herein relate to a communication that is made by a network including a plurality of node devices.

BACKGROUND

A node device that has joined an ad-hoc network is able to form a network by performing transmission and reception of a hello frame with another node device. For example, a node A that belongs to a certain ad-hoc network generates a hello frame that includes the route information held by the node A and broadcasts it periodically. A node B that has received the hello frame compares the route information held by the node B and the information included in the hello frame, and acquires the route information which the node B does not hold from the hello frame.

If the number of node devices that are included in an ad-hoc network increases, the ad-hoc network may be divided into a plurality of clusters, as illustrated in FIG. 1. Black circles in FIG. 1 represent node devices. In the example of FIG. 1, the ad-hoc network is divided into clusters A to C. In FIG. 1, ranges which radio waves from each node device reach are represented by dashed lines. For example, radio waves from the node N1 reach the nodes N2 and N4, so the node N1 can send a frame to the nodes N2 and N4. A node device such as the node N1 that is located near a boundary at which a plurality of clusters are in contact with one another can access a node device included in an adjacent cluster. Accordingly, for example, if a communication route is formed between clusters as represented by double lines in FIG. 1, a node device included in the cluster A is capable of communicating with a node device in another cluster via any of the nodes N1 to N3. Likewise, a node device included in the cluster B is capable of communicating with a node device in another cluster via the nodes N4 to N7, and a node device included in the cluster C is capable of communicating with a node device included in another cluster via the nodes N8 to N11.

A network in which a plurality of mobile nodes are grouped into a plurality of mobile groups is known as a related art. An administrator statically sets one of the mobile nodes included in a mobile group as a group leader of the mobile group. The mobile group leader provides supervisory control of the mobile group.

As an example, the following patent document discloses a related art.
Patent Document 1: Japanese National Publication (Translated PCT Application) No. 2009-508434

The number of node devices capable of communicating with a node device in an adjacent cluster may increase with an increase in the number of node devices in an ad-hoc network. A node device that does not perform a communication between clusters transfers a frame destined for a node device in another cluster, to a node device capable of communicating with a node device in an adjacent cluster from among the node devices which belong to the same cluster as itself. Accordingly, for a node device that communicates with a node device in another cluster, the number of candidate destinations to which to transfer a frame increases as the number of node devices capable of communicating with a node device in an adjacent cluster increases. If there are a large number of node devices that may serve as a destination to which to transfer a frame, the node device performs processing to determine a destination to which to transfer a frame, which results in complexity of processing of transferring a frame. Further, if the routing processing is more complicated, the time for routing will be longer, and a delay could be caused.

SUMMARY

According to an aspect of the embodiments, a selection device is selected from among a first group that is located in a first cluster and is a group of node devices capable of communicating with a node device in a second cluster adjacent to the first cluster. The selection device performs, with a node device adjacent to the selection device, transmission and reception of a report frame that reports an identifier of a node device included in the first group. The selection device selects from the first group a first relay device that relays a relay frame used for a communication between a node device in the first cluster and a node device in the second cluster. From among the node devices included in a second group, the first relay device determines a node device adjacent to the first relay device to be a second relay device that relays the relay frame to a node device in the second cluster. In this case, the second group is located in the second cluster and is a group of node devices capable of communicating with a node device in the first cluster.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A and 2B are block diagrams which illustrate exemplary communication methods according to an embodiment of the present invention.
FIG. 3 illustrates an exemplary format of a hello frame.
FIG. 6 illustrates exemplary master cluster information and an exemplary master cluster table.
FIG. 7 is a block diagram which illustrates an exemplary hardware configuration of a node device.

FIGS. 10A to 10C illustrate exemplary master cluster tables.

FIG. 11 illustrates exemplary slave cluster tables and an exemplary master cluster table.

FIGS. 12A to 12C illustrate exemplary master cluster tables and an exemplary slave cluster table.

FIGS. 13A to 13C illustrate exemplary master cluster tables.

FIG. 14 illustrates an exemplary slave cluster table.

FIGS. 16A to 16C illustrate exemplary master cluster tables.

FIGS. 17A to 17C illustrate exemplary master cluster tables and an exemplary slave cluster table.

FIGS. 18A and 18B illustrate exemplary master cluster tables.

FIGS. 19A and 19B illustrate exemplary master cluster tables.

FIG. 21A is a flowchart which illustrates exemplary processing of master cluster information.

FIG. 21B is a flowchart which illustrates exemplary processing of master cluster information.

FIGS. 24A and 24B illustrate exemplary data frames.

FIG. 25 illustrates an exemplary master cluster table used in a second embodiment.

FIG. 26 illustrates an exemplary slave cluster table used in the second embodiment.

FIGS. 28A to 28C illustrate exemplary master cluster tables.

FIGS. 29A to 29C illustrate exemplary master cluster tables.

FIG. 32A is a flowchart which illustrates exemplary processing of master cluster information according to the second embodiment.

DESCRIPTION OF EMBODIMENTS

Figure 1:
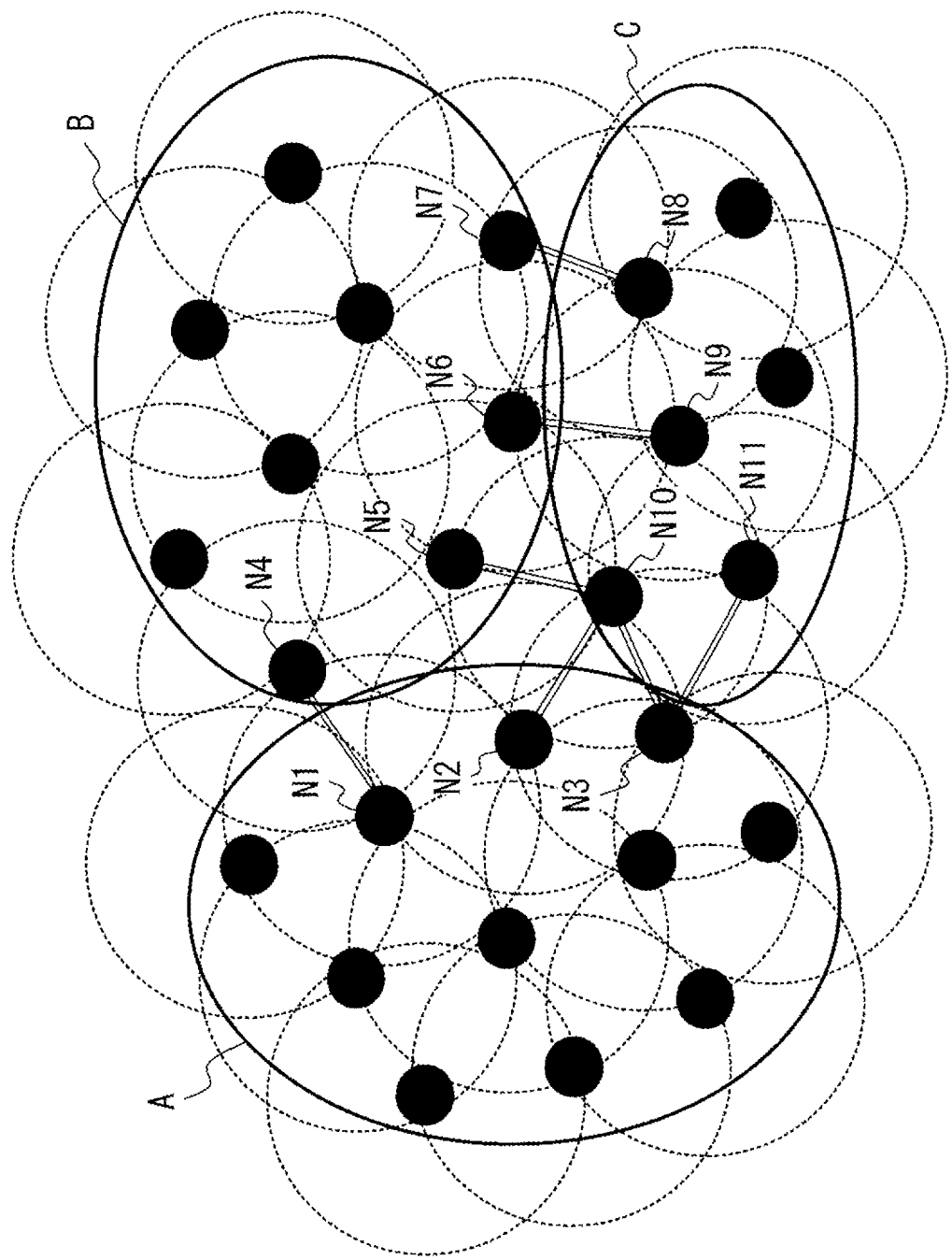
FIG. 1 illustrates an exemplary ad-hoc network.

FIGS. 2A and 2B are block diagrams which illustrate exemplary communication methods according to an embodiment of the present invention. In order to understand better, as an example, wireless ad-hoc networks divided into two clusters are described in FIGS. 2A and 2B.

A node device capable of communicating with a node device included in an adjacent cluster transmits a report frame including its identifier (node ID) and an identifier of the cluster which it has joined (cluster ID), to the adjacent node device. For better understanding, node devices which are adjacent to one another are connected with solid lines in FIGS. 2A and 2B. A node device that is "adjacent" to a certain node device refers to a node device located within a range in which a frame transmitted from the certain node device is receivable. Further, a node device located within a range in which a frame transmitted from a certain node device is receivable may be referred to as an "adjacent node device" of the certain node device.

A node device compares a cluster ID of the cluster which it has joined with a cluster ID included in a received report frame. A node device that selects a relay device is selected from among the node devices that are included in a cluster having a cluster ID including a smaller number. A node device that selects a relay device will hereinafter be referred to as a "selection device". The selection device will hereinafter be illustrated with bold lines. In the example of FIG. 2A, a node A in cluster ID=1 is selected as a selection device.

The selection device selects a first relay device from among the node devices capable of communicating with a node device in an adjacent cluster, from among the node devices located in the cluster including the selection device. The selection device reports a node ID of the first relay device to an adjacent node of the selection device. The node device to which the node ID of the first relay device was reported reports the node ID of the first relay device to an adjacent node device which belongs to the same cluster. For example, in the example of FIG. 2A, a node B is selected as a first relay device. Further, a node device included in cluster ID=1 recognizes that the node B is a first relay device by use of the report from the node B.

A node device in which a node ID assigned to itself is identical to an ID of a node operating as a first relay device recognizes that it relays a communication between a cluster in which it is located and an adjacent cluster. Further, the first relay device selects a second relay device from among the node devices included in an adjacent cluster, from among the adjacent node devices. The first relay device requests that the second relay cluster start relaying a communication between the clusters. In response to the request made by the first relay device, the second relay device recognizes that it has been selected as a node device that relays a communication between the clusters. In the example of FIG. 2B, a node B that has been selected as a first relay device selects, as a second relay device, a node C that is an adjacent node in an adjacent cluster. The node C reports to another node device other node devices included in cluster ID=7 that the node C is a second relay device.

After that, the first relay device and the second relay device relay a communication between the clusters. Thus, in the example of FIG. 2B, a node device included in a cluster with cluster ID=1 transmits to the node B a frame destined for a node device included in a cluster with cluster ID=7. The node B transfers to the node C the frame destined for the node device in the cluster with cluster ID=7. The node C transmits the frame to the destination node device. Further, a node device in the cluster with cluster ID=7 transmits to the node C a frame destined for a node device in the cluster with cluster ID=1. The node C transmits to the node B the frame destined for the node device in the cluster with cluster ID=1. The node B transmits the frame that has been transferred from the node C to the destination node device.

In this way, in one of the two adjacent clusters, a node device that relays between the clusters is autonomously determined, with the result that the number of node devices that relay a communication between the clusters decreases. Further, a first relay device selected by a selection device in the same cluster as a relay device that relays a communication between the clusters is an adjacent node device of the first relay device, and selects a second relay device from among the node devices in the adjacent cluster that is an adjacent node device of the first relay device. Accordingly, also in the cluster in which a node device that relays a communication between the clusters is not autonomously selected, the number of nodes that relay a communication between the clusters is restricted. Routing processing is simplified and a time for routing is shortened because the number of nodes that relay a communication between the clusters decreases.

<Report Frame>

A hello frame may be used as a report frame. The hello frame may include information to make a request to operate as a first or second relay device. When modifying in this way, a relay device can be set without using any control frame except for a hello frame, which permits a setting of a relay device without burdening a network.

A case in which a hello frame is used as a report frame will now be described as an example. A node device capable of directly communicating with a node device included in an adjacent cluster may hereinafter be referred to as a "boundary node". Further, a node device communicating between clusters is referred to as a "sub-gateway". Furthermore, a node device selecting a sub-gateway from among the node devices in the same cluster is referred to as a "leader node". In order to easily distinguish adjacent clusters, among the clusters adjacent to each other, a cluster to which a leader node belongs is referred to as a "master cluster", and a cluster which does not include the leader node is referred to as a "slave cluster". Thus, a node device that is set as a sub-gateway is an exemplary relay device illustrated in FIGS. 2A and 2B, and a node device which is selected as a leader node is an exemplary selection device described with reference to FIGS. 2A and 2B. The leader node selects a sub-gateway from among the boundary nodes in a master cluster. The sub-gateway selected in the master cluster selects a sub-gateway in a slave cluster.

FIG. 3 illustrates an exemplary format of a hello frame. The hello frame includes a frame type, address information, route information, cluster information (CI), master cluster information (MCI), and an adjacent cluster count (CCNT). The address information includes a global destination (GD), a global source (GS), a local destination (LD), and a local source (LS). A master cluster information field in a hello frame is used in a hello frame generated in a boundary node included in a master cluster.

The frame type is information that indicates kinds of frames uniquely. For example, it is set as frame type=0 in a hello frame, and it is set as frame type=1 in a data frame. The "global destination" refers to a final destination of the frame. On the other hand, a node device that generates the frame is referred to as a "global source". The "local destination" is a node device designated as a destination upon one-hop transferring that is performed to transmit the frame to the final destination. The "local source" is a source node device when the frame is transferred in one hop. The hello frame is broadcasted from the source node device to the one-hop node device. Accordingly, when a frame is a hello frame, a local source and a global source are both the node device which generated the hello frame. Further, a local destination and a global destination of the hello frame are both an address that indicates a broadcast to all adjacent node devices.

The route information includes information that identifies a node device holding the route through which a node device that generated a hello frame transmits the frame. The cluster information is information on the cluster which the node device that generated a hello frame has joined. The cluster information includes a cluster ID and an identifier of a node device included in a cluster. Further, for a node device that is set as a sub-gateway in a cluster, the cluster information also includes information indicating that the node device is set as a sub-gateway in association with an identifier assigned to the node device. An identifier of a cluster will now be represented by a letter C followed by a number used to determine the cluster uniquely. On the other hand, an identifier of a node device will now be represented by a letter N followed by a number used to determine the node device uniquely. The cluster information may further include other information, depending on implementation. For example, in a system in which a cluster is formed dynamically, cluster information may include information that indicates whether the number of node devices included in the cluster reaches an upper limit.

The master cluster information field is used to report information held by a boundary node of a master cluster. The information reported by use of the master cluster information field will be described below.

The adjacent cluster count is the number of clusters other than the cluster which a node device that generated a hello frame has joined, from among the clusters that include a node device with which the node device that generated the hello frame is capable of communicating. For example, adjacent node devices of a node N1 in a cluster C1 are nodes N2 to N6, in which the nodes N2 to N4 are included in the cluster C1, the node N5 in the cluster C2, and the node N6 in the cluster C3. In this case, the adjacent cluster count of the node N1 is 2.

<Device Configuration>

Figure 4:
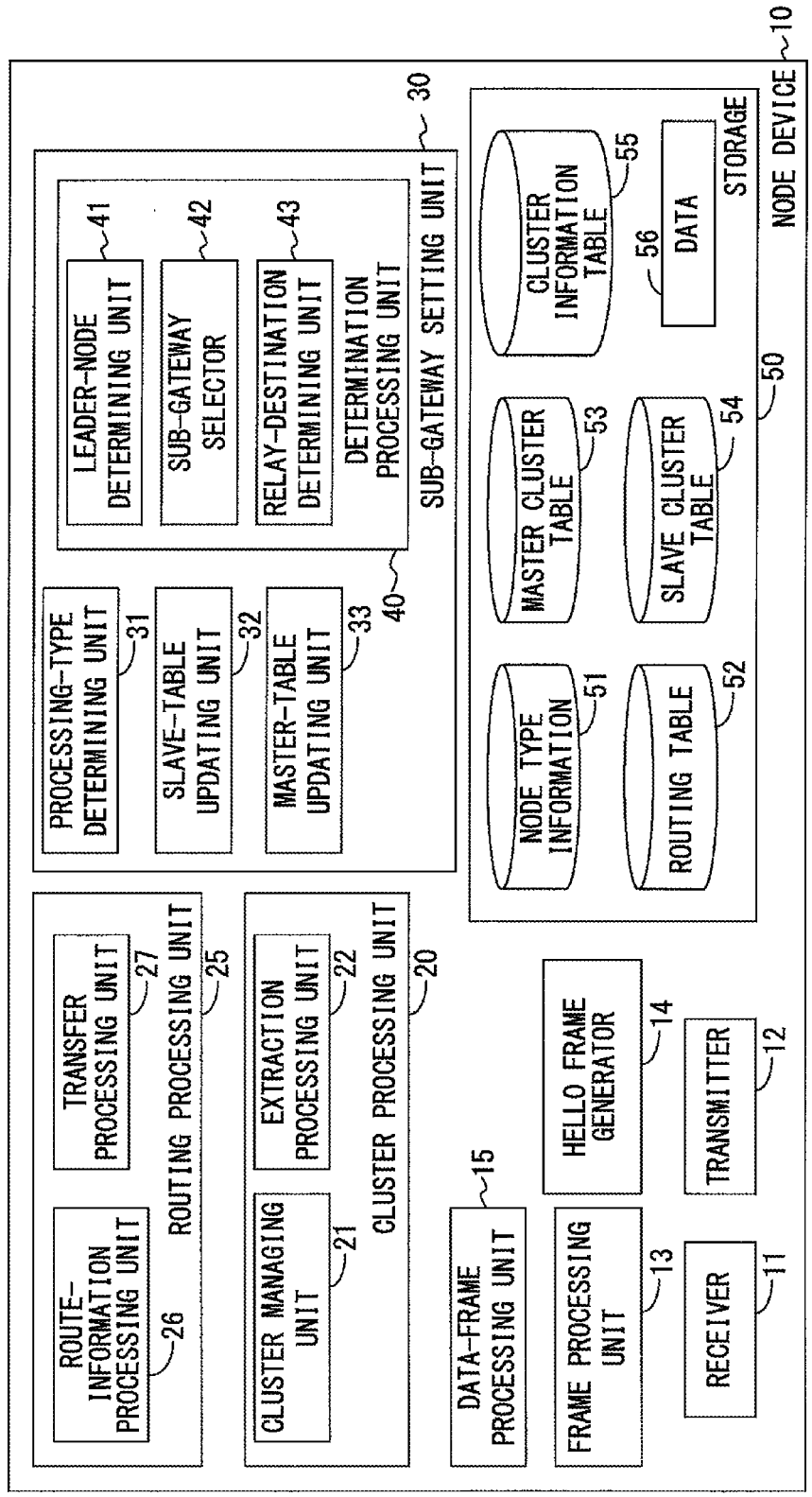
FIG. 4 is a block diagram which illustrates an exemplary configuration of a node device.

FIG. 4 is a block diagram which illustrates an exemplary configuration of a node device 10. FIG. 4 is an example of a node device 10 that is used when a relay device is set by use of a hello frame.

The node device 10 includes a receiver 11, a transmitter 12, a frame processing unit 13, a hello frame generator 14, a data-frame processing unit 15, a cluster processing unit 20, a routing processing unit 25, a sub-gateway setting unit 30, and a storage 50. The cluster processing unit 20 includes a cluster managing unit 21 and an extraction processing unit 22. The routing processing unit 25 includes a route-information processing unit 26 and a transfer processing unit 27. The sub-gateway setting unit 30 includes a processing-type determining unit 31, a slave-table updating unit 32, a master-table updating unit 33, and a determination processing unit 40. The determination processing unit 40 includes a leader-node determining unit 41, a sub-gateway selector 42, and a relay-destination determining unit 43. The storage 50 holds node-type information 51, a routing table 52, a master cluster table 53, slave cluster table 54, a cluster information table 55, and data 56.

The receiver 11 receives a frame which is transmitted to the node device 10. The receiver 11 outputs the received frame to the frame processing unit 13. The frame processing unit 13 checks a frame type included in the input frame. A value of a frame type is different for different frame types. For example, a hello frame and a data frame have different values. The frame processing unit 13 can store in advance the values of a frame type corresponding to the respective kinds of the frames that can be received by the node device 10 or can appropriately acquire them from the storage 50. The frame processing unit 13 outputs the hello frame to the extraction processing unit 22 and the route-information processing unit 26, and the data frame to the data-frame processing unit 15. The transmitter 12 transmits the frame input by the hello frame generator 14, the data-frame processing unit 15, or the transfer processing unit 27, to a local destination of the frame. The hello frame generator 14 generates a hello frame periodically. The hello frame generator 14 outputs a hello frame to the transmitter 12. The data-frame processing unit 15 processes a frame destined for its node by use of an application. On the other hand, when a global destination of the frame input from the frame processing unit 13 is another node device 10, the data-frame processing unit 15 outputs the frame to the transfer processing unit 27.

The cluster processing unit 20 performs processing of generating and holding a cluster. In this case, a cluster may be determined statically or may be generated dynamically. The cluster managing unit 21 processes information on a node device 10 included in a cluster for each cluster. When a node device 10 included in a cluster is determined statically, the cluster managing unit 21 determines the cluster which its node has joined, on the basis of the cluster information table 55. The cluster information table 55 records therein an identifier of a node device 10 included in the cluster in association with an identifier of the cluster. On the other hand, when a cluster is determined dynamically according to the number of node devices 10 included in an ad-hoc network or to the positions of the node devices 10, the cluster managing unit 21 performs cluster-generating processing. In this case, the cluster managing unit 21 generates and integrates clusters. Further, the cluster managing unit 21 updates the cluster information table 55.

The extraction processing unit 22 extracts cluster information, master cluster information, and an adjacent cluster count from a hello frame received from an adjacent node device 10. The extraction processing unit 22 outputs the cluster information included in the hello frame to the cluster managing unit 21. Further, the extraction processing unit 22 outputs the cluster information, the master cluster information, and the adjacent cluster count to the processing-type determining unit 31.

The routing processing unit 25 performs processing of frame routing. The route-information processing unit 26 acquires route information from the hello frame received from the adjacent node device 10 and generates the routing table 52. The transfer processing unit 27 determines a transfer destination by use of the routing table 52 according to a global destination of the frame.

The sub-gateway setting unit 30 performs processing of determining a sub-gateway. The processing-type determining unit 31 determines whether its node is a boundary node. When its node is a boundary node, the processing-type determining unit 31 further determines whether its node is included in a master cluster. The processing-type determining unit 31 determines a destination to which to output the information input by the extraction processing unit 22, on the basis of a result of the determination. The processing-type determining unit 31 performs a determination by comparing a cluster ID of the cluster which its node has joined and a cluster ID included in the cluster information input by the extraction processing unit 22. When a hello frame that includes a cluster ID other than the ID of the cluster which its node has joined has not been received, a cluster ID of a cluster other than the cluster which its node has joined is not input in the processing-type determining unit 31. In this case, the processing-type determining unit 31 determines that its node is not a boundary node. Then, the processing-type determining unit 31 discards the information input by the extraction processing unit 22.

On the other hand, consider a cluster ID that includes a larger number than the cluster ID of the cluster which its node has joined being input in the processing-type determining unit 31. Then, the processing-type determining unit 31 determines that the cluster which its node has joined is a master cluster for a cluster identified by the input cluster ID. Accordingly, the processing-type determining unit 31 determines that its node operates as a boundary node of a master cluster. Then, the processing-type determining unit 31 outputs the master cluster information and the adjacent cluster count to the leader-node determining unit 41.

When a cluster ID that includes a smaller number than the cluster ID of the cluster which its node has joined is input, the processing-type determining unit 31 determines that the cluster which its node has joined is a slave cluster for a cluster identified by the input cluster ID. Accordingly, the processing-type determining unit 31 determines that its node operates as a boundary node of a slave cluster. Then, the processing-type determining unit 31 outputs the master cluster information and the adjacent cluster count to the slave-table updating unit 32.

Figure 5:
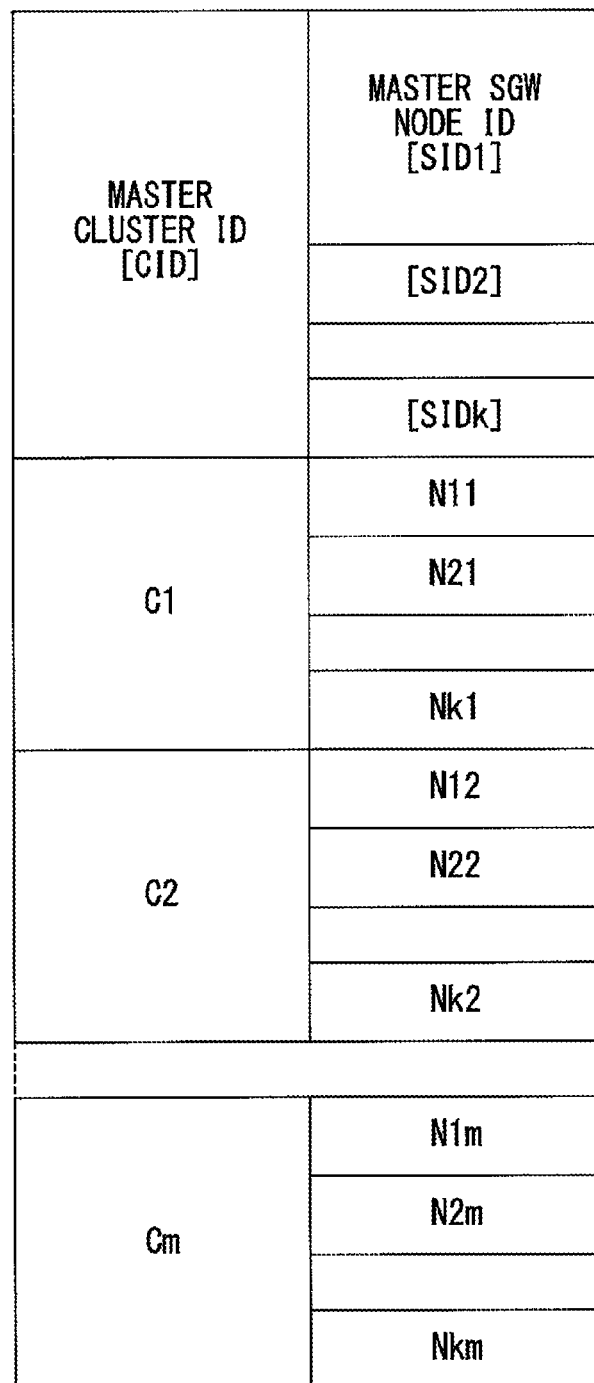
FIG. 5 illustrates an exemplary slave cluster table.

When it has been determined that its node is a boundary node of a slave cluster, the slave-table updating unit 32 updates the slave cluster table 54 by use of the information input by the processing-type determining unit 31. FIG. 5 illustrates an exemplary slave cluster table 54. For each master cluster, the slave cluster table 54 records therein a node identifier of a sub-gateway that has been set in a master cluster, in an associated manner. In the example of FIG. 5, the number (m) of adjacent clusters that are to be a master cluster is plural. Further, in the example of FIG. 5, the number of sub-gateways relaying a communication with a master cluster is also plural. For example, the number of sub-gateways relaying a communication with a cluster C1 is k1, k2 for a communication with a cluster C2, and km for a communication with a cluster Cm.

The master-table updating unit 33, the leader-node determining unit 41, the sub-gateway selector 42, and the relay-destination determining unit 43 operate in a node device 10 that has been determined to be a boundary node of a master cluster. The master cluster table updating unit 33 updates the master cluster table 53 by use of master cluster information. A of FIG. 6 illustrates exemplary master cluster information included in a hello frame. The master cluster information is information in which a cluster ID assigned to a slave cluster is associated with information used to set a sub-gateway and information of a leader node. The information used to set a sub-gateway includes an identifier of a sub-gateway of a slave cluster (SID), an identifier of a sub-gateway of a master cluster (MGW), and an adjacent cluster count of a sub-gateway of a master cluster (SGWCNT). A sequence number for a master sub-gateway (SGWSN) is also included in the master cluster information. The sequence number for a master sub-gateway has a different value according to a hello frame of a master sub-gateway and is used as an indication of a newness of the information on a master sub-gateway.

Information on a leader node of a master cluster and information on a sub-gateway candidate in a master cluster are also included in the master cluster information. The information on a leader node of a master cluster includes an identifier of a leader node (LID) and a sequence number for a leader node (LIDSN). The sequence number for a leader node is a value incremented for each hello frame generated by a leader node. The sequence number for a leader node is used as an indication of a newness of the information on a leader node. The sub-gateway candidate in a master cluster (CSID) includes information on a node device 10 that has been determined to have a better condition for a sub-gateway than the present sub-gateway in the master cluster. An adjacent cluster count of a sub-gateway candidate (CSCNT) is associated with a node ID of the sub-gateway candidate.

The master cluster table 53 is a table that records therein master cluster information for each adjacent slave cluster. B of FIG. 6 illustrates an exemplary master cluster table 53. In the example illustrated in B of FIG. 6, the number of adjacent slave clusters is n. In this case, n may be any natural number.

The leader-node determining unit 41 determines the leader node included in master cluster information or its node to be a leader node. When its node is a leader node, the leader-node determining unit 41 outputs the master cluster information to the sub-gateway selector 42 and makes a request to select a sub-gateway. On the other hand, when its node is not a leader node, the leader-node determining unit 41 outputs the master cluster information to the master-table updating unit 33. The leader-node determining unit 41 records a result of the determination in a field of a leader node in the master cluster table 53. Criteria of selecting a leader node is set to each node device 10 in advance. The criteria of selecting a leader node can be set discretionarily depending on implementation when the criteria in each of the node devices 10 are identical. A method for selecting a leader node will be described below with reference to an exemplary case in which a node device 10 having a node ID including a smaller number is more likely to be selected as a leader node.

The sub-gateway selector 42 operates in a node device 10 that has been selected as a leader node. The sub-gateway selector 42 selects a node device 10 that operates as a sub-gateway in a master cluster. Criteria of selecting a sub-gateway in a master cluster is set to a sub-gateway selector 42 in each node device 10 in advance. The criteria of selecting a sub-gateway in a master cluster, too, can be set discretionarily depending on implementation when the criteria in each of the node devices 10 are identical. A method for selecting a sub-gateway will be described below with reference to an exemplary case in which a node device 10 having a larger adjacent cluster count is more likely to be selected as a sub-gateway. The sub-gateway selector 42 of a leader node records an identifier and an adjacent cluster count of a node device 10 selected as a sub-gateway in the master cluster table 53. When master cluster information includes sub-gateway candidate information, the sub-gateway selector 42 compares the previously determined sub-gateway with the reported sub-gateway candidate, and selects one of them as a sub-gateway.

The relay-destination determining unit 43 operates in a node device 10 that has been determined to be a sub-gateway of a master cluster. From among the adjacent node devices included in a slave cluster, the relay-destination determining unit 43 selects a node device 10 that serves as a relay destination of a frame used for a communication between the clusters. The selected node device 10 serves as a sub-gateway in the slave cluster. The relay-destination determining unit 43 records the information on the determined relay destination in the master cluster table 53.

The node-type information 51 holds information that indicates whether its node is set as a sub-gateway. The data 56 is used for processing performed in the frame processing unit 13, the hello frame generator 14, the data-frame processing unit 15, the cluster processing unit 20, the routing processing unit 25, and the sub-gateway setting unit 30. In addition to data set by, for example, an operator, the data 56 also includes data obtained from the processing performed in the frame processing unit 13, the hello frame generator 14, the data-frame processing unit 15, the cluster processing unit 20, the routing processing unit 25, and the sub-gateway setting unit 30.

FIG. 7 is a block diagram which illustrates an exemplary hardware configuration of a node device 10. The node device 10 includes a processor 100, buses 101 (101*a* to 101*c*), a timer IC 104, a dynamic random access memory (DRAM) 106, a flash memory 107, and a wireless module 108. The node device 10 may include a PHYsical layer (PHY) chip 102 used for a wired communication as an option. The buses 101*a* to 101*c* connect the processor 100, the PHY chip 102, the timer IC 104, the DRAM 106, the flash memory 107, and the wireless module 108 so that data can be input and output.

The processor 100 is any processing circuit including a micro processing unit (MPU). The processor 100 performs processing by reading a program such as firmware stored in the flash memory 107 in a non-transitory manner. In this case, the processor 100 can use the DRAM 106 as a working memory. In the node device 10, the processor 100 operates as the frame processing unit 13, the hello frame generator 14, the data-frame processing unit 15, the cluster processing unit 20, the routing processing unit 25, and the sub-gateway setting unit 30. In the node device 10, the DRAM 106 operates as the storage 50. The receiver 11 and the transmitter 12 are realized by the wireless module 108.

The timer IC 104 is used to measure the intervals at which a hello frame is transmitted and the intervals at which a hello frame is received from an adjacent node device 10. In other words, the timer IC 104 operates as a part of, for example, the hello frame generator 14 and the route-information processing unit 26.

A program such as firmware may be provided stored in a computer-readable recording medium so as to be installed in a node device 10. Also, the program may be downloaded from a network via the PHY chip 102 or the wireless module 108 so as to be installed in the node device 10. Another type of storage device other than the DRAM 106 or the flash memory 107 may be used according to embodiments. The node device 10 may be realized by a computer.

First Embodiment

An exemplary method for setting a sub-gateway will now be described, divided into a case in which a sub-gateway is newly set and a case in which a sub-gateway is changed according to an increase or decrease in node device 10.

[Setting of Sub-Gateway]

Figure 8A:
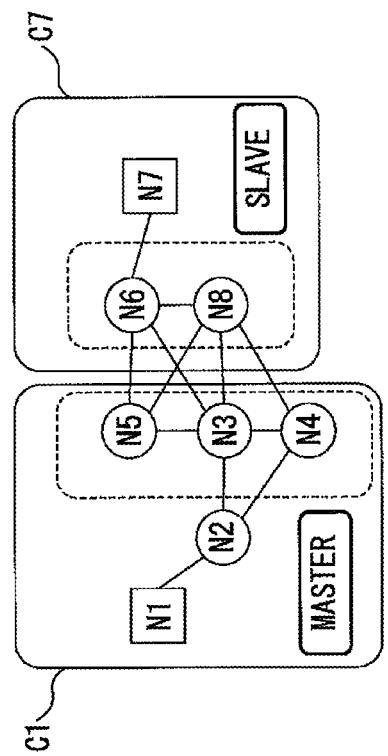
FIGS. 8A to 8D are block diagrams which illustrate exemplary methods for setting a sub-gateway (or sub-gateways).

FIGS. 8A to 8D are block diagrams which illustrate exemplary methods for setting a sub-gateway. In the examples of FIGS. 8A to 8D, a cluster C1 and a cluster C7 are adjacent. The cluster C1 includes nodes N1 to N5, and the cluster C7 includes nodes N6 to N8. From transmission and reception of a hello frame performed between adjacent nodes, a node device capable of receiving a hello frame from a node device included in an adjacent cluster recognizes that it is a boundary node. In the example of FIG. 8A, the nodes N3 to N6 and N8 may be boundary nodes. In the examples of FIGS. 8A to 8D, the nodes that may be boundary nodes are boxed in using dashed lines. A boundary node determines a master cluster by comparing a cluster ID of a cluster which an adjacent node device has joined with a cluster ID of the cluster which its node has joined. In the case of FIG. 8A, the cluster C1 is a master cluster, and the cluster C7 is a slave cluster. Thus, the nodes N3 to N5 operate as boundary nodes of the master cluster, and the nodes N6 and N8 operate boundary nodes of the slave cluster.

Figure 8B:
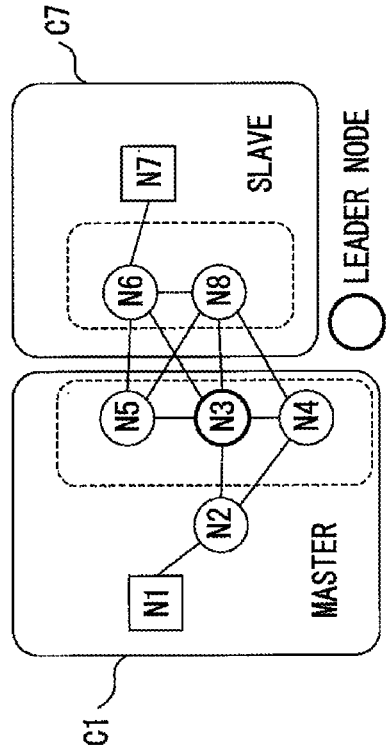
Figure 8C:
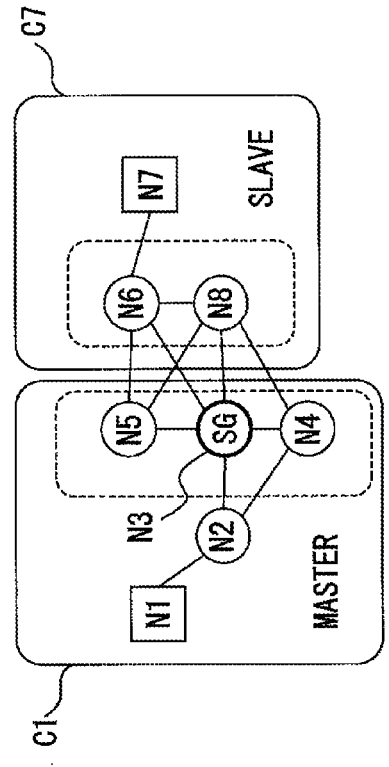
Figure 8D:
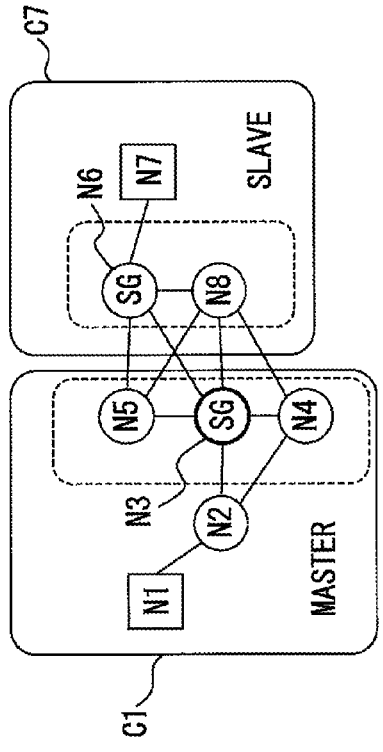

A leader node is selected from among the boundary nodes of the master cluster. When a node having a node ID including a smaller number is more likely to be selected as a leader node, the node N3 is set as a leader node, as illustrated in FIG. 8B. The leader node selects a sub-gateway in the master cluster. A boundary node in the master cluster that has not been selected as a leader node is not allowed to select a sub-gateway and follows a selection made by the leader node. In the example of FIG. 8C, the node N3 that is a leader node selects the node N3 as a sub-gateway. Accordingly, in the example of FIG. 8C, the node N3 serves as a leader node and a sub-gateway. The sub-gateway of the master cluster selects a sub-gateway in the slave cluster from among the adjacent nodes that have joined the slave cluster. In the example of FIG. 8D, the node N3 selects the node N6 as a slave sub-gateway.

In this case, depending on the order of transmission of a hello frame, a node device 10 that has a better condition for a sub-gateway than the node device 10 that already operates as a sub-gateway may occur after the leader node determines the sub-gateway. Then, a boundary node in the master cluster determines, by use of master cluster information, whether there is a node device 10 that has a better condition for a sub-gateway than the node device 10 that has been set as a sub-gateway. When it finds a node device 10 that has a better condition for a sub-gateway, the leader node changes the sub-gateway. When it finds a node device 10 that has a better condition for a sub-gateway than the node device 10 that has been set as a sub-gateway, a boundary node other than the leader node reports information on the found node device 10 to the leader node as a sub-gateway candidate. The leader node compares the condition of the sub-gateway candidate reported by the other boundary node in the master cluster, with the condition of the node device 10 that has been set as a sub-gateway. When the condition of the sub-gateway candidate is better, the leader node changes the sub-gateway of the master cluster. The sub-gateway of the master cluster can change a sub-gateway in the slave cluster. For example, the sub-gateway of the master cluster changes the sub-gateway of the slave cluster when it finds a node device 10 that has a better condition than the sub-gateway of the slave cluster.

FIGS. 9A to 9D are sequence diagrams which illustrate exemplary processing according to a first embodiment. A specific example of a method for setting a sub-gateway, including a process of change in a sub-gateway, will now be described with reference to FIGS. 9A to 9D. An exemplary ad-hoc network illustrated in FIG. 8A is also described in FIGS. 9A to 9D. In Procedure P1, no node device 10 knows whether it is a boundary node. Other figures that illustrate examples of a master cluster table 53 and a slave cluster table 54 may be referred to when using FIGS. 9A to 9D. Thus, in FIGS. 10 to 14, the number of a procedure by which a table is updated is placed after a numerical reference for the table, with an underscore between the number and the numerical reference. For example, a master cluster table 53 obtained by performing Procedure P2 has the number "53_2". In addition, numbers for the updated tables will also be illustrated in FIGS. 9A to 9D so that the figures can be referred to easily.

In Procedure P1, a hello frame generator 14 of the node N6 generates a hello frame when it is time to generate a hello frame. The hello frame generator 14 acquires a cluster ID (C7) from a cluster managing unit 21, so as to generate a hello frame that includes the following information elements:
Type: Hello frame
GS: Node N6
LS: Node N6
Cluster ID in cluster information: C7
Master cluster information: null
Adjacent cluster count: 0
The hello frame generator 14 outputs the generated hello frame to a transmitter 12. The transmitter 12 of the node N6 transmits the hello frame to an adjacent node device 10.

In Procedure P2, the node N3 receives the hello frame that was transmitted from the node N6. Processing performed when the node N3 receives a hello frame from the node N6 will now be described in detail, divided into Procedures P2a to P2d with reference to FIGS. 8A to 8D.

In Procedure P2a, a frame processing unit 13 of the node N3 outputs the hello frame that was received from the node N6 via a receiver 11 to an extraction processing unit 22. The extraction processing unit 22 outputs to a processing-type determining unit 31 cluster information and an adjacent cluster count included in the hello frame received from the node 6. The processing-type determining unit 31 of the node N3 remembers that the cluster ID of the cluster which the node N3 has joined is C1. The processing-type determining unit 31 determines that the node N3 is a boundary node because the cluster ID of the cluster which the node N3 has joined is C1 and the cluster ID included in the received hello frame is C7. Further, as illustrated in FIG. 8A, the processing-type determining unit 31 determines the cluster C1 to be a master cluster in a combination of the clusters C1 and C7 because C1 has a smaller number included in a cluster ID than C7.

In Procedure P2b, the processing-type determining unit 31 outputs the information input by the extraction processing unit 22, to a leader-node determining unit 41. The node N3 is the only node which the leader-node determining unit 41 of the node N3 recognizes as a boundary node because a hello frame that includes master cluster information has not been transmitted to the node N3 from any node device 10. Thus, as illustrated in FIG. 8B, the leader-node determining unit 41 sets the node N3 as a leader node. Further, the leader-node determining unit 41 records the following information in a master cluster table 53:
Adjacent cluster ID: C7
Node ID of leader node: N3
Sequence number of leader node: 0

In Procedure P2c, the leader-node determining unit 41 of the node N3 requests that a sub-gateway selector 42 select a sub-gateway. The sub-gateway selector 42 selects as a sub-gateway a node device 10 having a largest adjacent cluster count from among the boundary nodes for the cluster C7 in the cluster C1. In this case, the node N3 does not recognize any node except for the node N3 as a boundary node between the cluster C1 and the cluster C7. Accordingly, as illustrated in FIG. 8C, the sub-gateway selector 42 of the node N3 selects the node N3 as a sub-gateway. Then, the sub-gateway selector 42 records the following information as an entry of adjacent cluster ID=C7 in the master cluster table 53:

Node ID of sub-gateway: N3
Sequence number of sub-gateway: 0
Adjacent cluster count of sub-gateway: 1
Sub-gateway candidate: null
Adjacent cluster count of sub-gateway candidate: 0

In Procedure P2d, a relay-destination determining unit 43 of the node N3 determines a sub-gateway of the slave cluster because the node N3 has been selected as a sub-gateway of the master cluster. The relay-destination determining unit 43 determines that the node N6 is an adjacent node device included in C7, which is a slave cluster, because the node N3 has received a hello frame from the node N6. At this point, the relay-destination determining unit 43 selects the node N6 as a sub-gateway in the slave cluster because it has not detected any other adjacent node device included in C7 that is a slave cluster. When the node N6 is selected as a sub-gateway, a sub-gateway is set as illustrated in FIG. 8D. The relay-destination determining unit 43 records the information on the determined relay-destination as an entry of adjacent cluster ID=C7 in the master cluster table 53.

When the processing from Procedure P2a to Procedure P2d is performed, the master cluster table 53 held by the node N3 becomes as illustrated in a master cluster table 53_2 (FIG. 10A). However, in Procedure P2d, it is determined that the node N3 requests that the node N6 operate as a sub-gateway, but the node N6 has not operated as a sub-gateway yet.

Figure 9A:
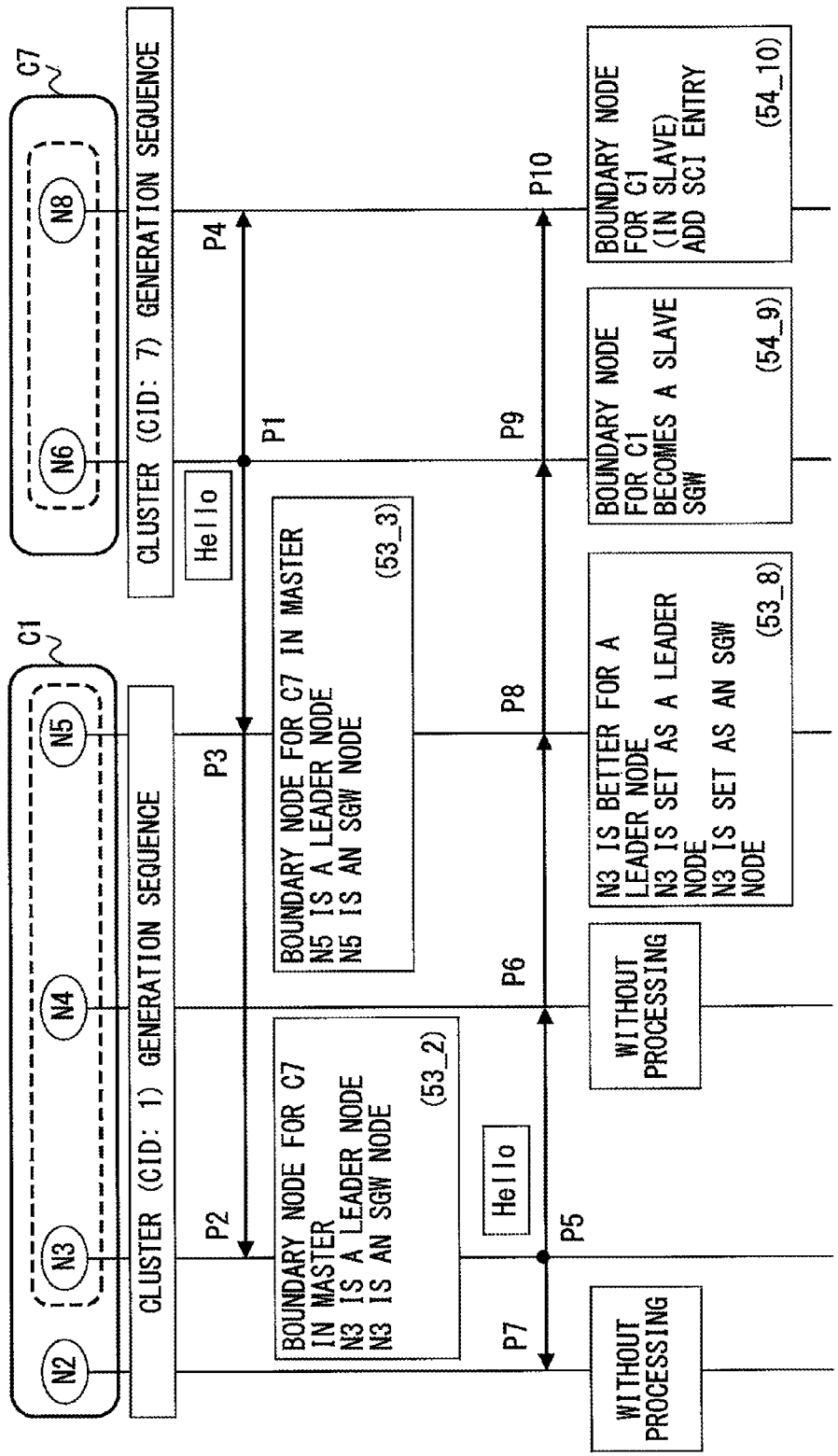
FIG. 9A is a sequence diagram which illustrates exemplary processing according to a first embodiment.
Figure 9B:
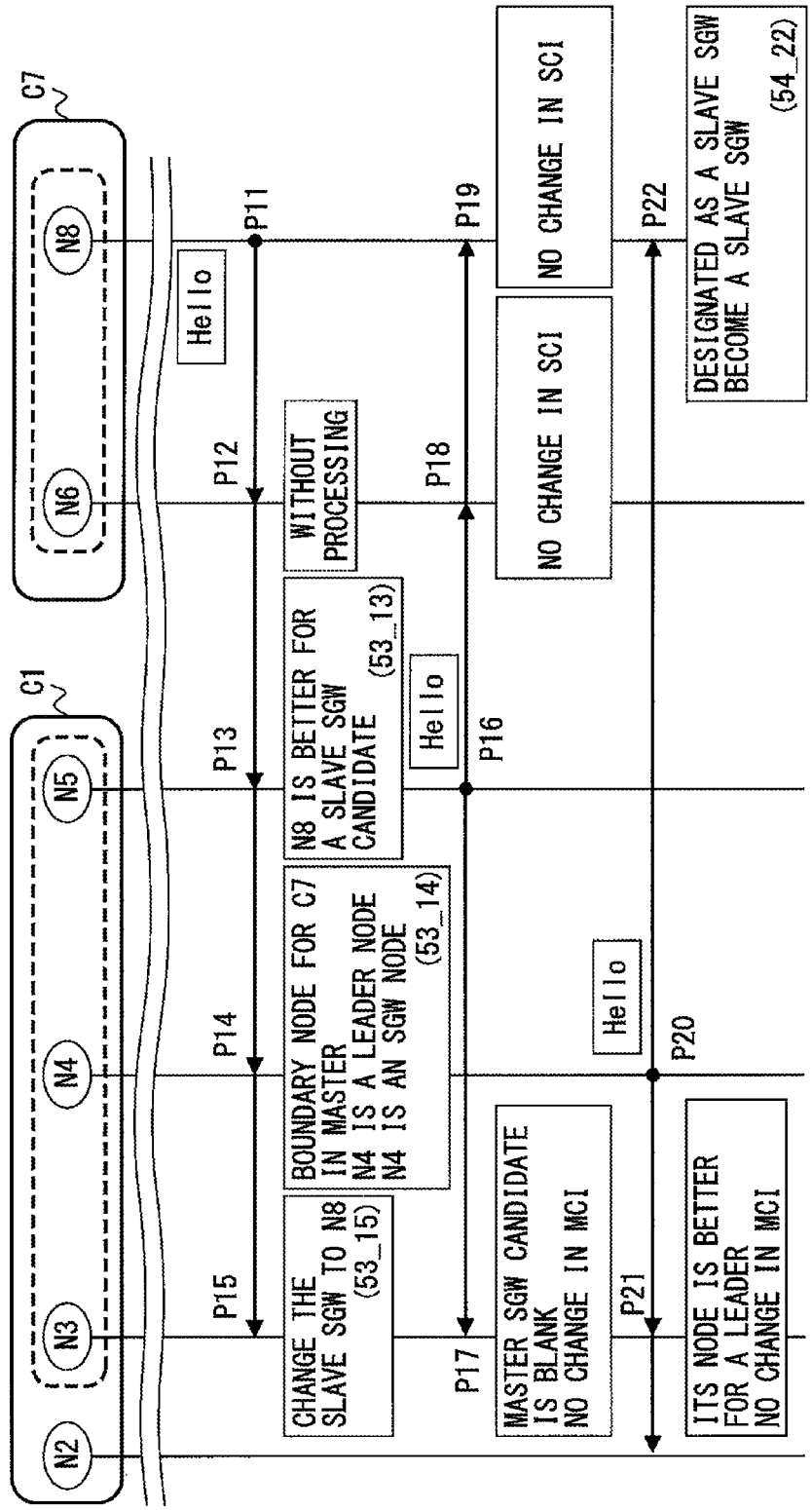
FIG. 9B is a sequence diagram which illustrates exemplary processing according to the first embodiment.

In Procedure P3 in FIG. 9A, the node N5 processes a hello frame received from the node N6. Processing performed in the node N5 is similar to the processing described in Procedure P2. When the processing is performed in the node N5, a master cluster table 53 held by the node N5 becomes as illustrated in a master cluster table 53_3 (FIG. 10B).

In Procedure P4, the node N8 receives a hello frame from the node N6. A receiver 11, a frame processing unit 13, and an extraction processing unit 22 perform processing as described in Procedure P2a with reference to the example of the node N3. A processing-type determining unit 31 determines that the node N8 is not a boundary node because the cluster ID of the cluster which the node N8 has joined is C7 and the cluster ID included in the received hello frame is also C7. Thus, the processing-type determining unit 31 of the node N8 discards the information input by the extraction processing unit 22. On the other hand, a route-information processing unit 26 acquires the route information included in the hello frame and updates a routing table 52 because it has received the hello frame from a node device 10 in the same cluster. When receiving a hello frame from the node N6, the node N7, too, performs processing as in the node N8.

In Procedure P5, a hello frame generator 14 of the node N3 generates a hello frame when it is time to generate a hello frame. The hello frame generator 14 acquires a cluster ID (C1) from a cluster managing unit 21. Further, it includes master cluster information generated from the master cluster table 53_2 (FIG. 10A) in the hello frame. When the elements included in the master cluster information are as illustrated in A of FIG. 6, the generated hello frame includes the following information elements:
Type: Hello frame
GS: Node N3
LS: Node N3
Cluster ID in cluster information: C1
Sub-gateway in cluster information: Node N3
Adjacent cluster count: 1
Master cluster information
   Adjacent cluster ID: C7
   Node ID of slave sub-gateway: N6

Node ID of leader node: N3
Sequence number of leader node: 1
Node ID of sub-gateway: N3
Sequence number of sub-gateway: 1
Adjacent cluster count of sub-gateway: 1
Sub-gateway candidate: null
Adjacent cluster count of sub-gateway candidate: 0

The hello frame generator 14 outputs the generated hello frame to a transmitter 12. The transmitter 12 of the node N3 transmits the hello frame to an adjacent node device 10.

In Procedure P6, the node N4 receives a hello frame from the node N3. At this point, the node N4 does not recognize that the node N4 is a boundary node because the node N4 has not received a hello frame from a node device 10 included in the cluster C7. Further, a processing-type determining unit 31 of the node N4 determines that the node N4 is not a boundary node because the node N4 has joined the cluster C1 and the cluster ID included in the received hello frame is also C1. Thus, as in the nodes N7 and N8 in Procedure P4, processing to be performed by a boundary node is not performed in the node N4. Cluster information in the hello frame received from the node N3 has recorded therein that the node N3 is a sub-gateway. Thus, a cluster managing unit 21 of the node N4 recognizes that the node N3 is a sub-gateway in the cluster C1.

In Procedure P7, the node N2, too, receives a hello frame from the node N3. The node N2 does not perform processing to be performed by a boundary node because a processing-type determining unit 31 of the node N2 determines that the node N2 is not a boundary node. As in the node N4, a cluster managing unit 21 of the node N2 recognizes that the node N3 is a sub-gateway in the cluster C1 by reading cluster information in the hello frame.

In Procedure P8, the node N5 receives a hello frame from the node N3. A processing-type determining unit 31 of the node N5 determines in Procedure P3 that the node N5 operates as a boundary node in the master cluster when a sub-gateway between the cluster C1 and the cluster C7 is set. Thus, the processing-type determining unit 31 outputs the master cluster information included in the hello frame received from the node N3, to a leader-node determining unit 41.

The leader-node determining unit 41 of the node N5 compares the node ID of a leader node included in the master cluster information with the information on a leader node in the master cluster table 53 held by the node N5. The leader node that has been reported by the hello frame is the node N3, and the leader node recorded in the master cluster table 53 is the node N5. Thus, the leader-node determining unit 41 determines that the node N3 has a better condition for a leader node than the node N5, and changes the setting of the leader node as illustrated in a master cluster table 53_8 (FIG. 10C).

A master-table updating unit 33 changes the master cluster table 53 according to the master cluster information that has been reported by the node N3 because the node N5 is no longer a leader node. Accordingly, as illustrated in the master cluster table 53_8, the sub-gateway in the master cluster is changed to the node N3 according to the determination of the node N3 that is a leader node. Further, the master-table updating unit 33 also updates the sub-gateway of the slave cluster according to the determination of the leader node. In this case, the setting of the sub-gateway of the slave cluster is not changed because the node N5 determined to select the node N6 as a slave sub-gateway before receiving the report from the node N3.

Further, a cluster managing unit 21 of the node N5 recognizes on the basis of the cluster information that the node N3 is a sub-gateway in the cluster C1. In addition, the cluster managing unit 21 also acquires from the master-table updating unit 33 the information that the node N5 is no longer a sub-gateway.

In Procedure P9, the node N6 receives a hello frame from the node N3. A processing-type determining unit 31 of the node N6 determines that the node N6 is a boundary node in the slave cluster because the node N6 has joined the cluster C7 and the cluster ID included in the received hello frame is C1. Then, a slave-table updating unit 32 generates an entry in which the cluster C1 is a master cluster in a slave cluster table 54 by use of the master cluster information. The slave-table updating unit 32 determines that its node has been requested to operate as a sub-gateway because the node ID of a sub-gateway included in the master cluster information is identical to the node ID of its node. The processing performed by the slave-table updating unit 32 permits generating of a slave cluster table 54_9 (FIG. 11). The node N6 starts operating as a sub-gateway of the cluster C7.

In Procedure P10, the node N8, too, receives a hello frame from the node N3. Processing performed in the node N8 is similar to the processing performed in the node N6 described in Procedure P9. However, a slave-table updating unit 32 of the node N8 determines that the node N8 has not been requested to operate as a sub-gateway because the node ID of a sub-gateway included in the master cluster information is N6. Then, a slave cluster table 54 in the node N8 becomes as illustrated in a master cluster table 54_10 (FIG. 11).

In Procedure P11, a hello frame generator 14 of the node N8 generates a hello frame when it is time to generate a hello frame. A hello frame that includes the following information elements is generated because the node N8 is a boundary node in the slave cluster:
Type: Hello frame
GS: Node N8
LS: Node N8
Cluster ID in cluster information: C7
Master cluster information: null
Adjacent cluster count: 1
The generated hello frame is transmitted to an adjacent node of the node N8.

In Procedure P12, the node N6 receives a hello frame from the node N8. The node N6 is a boundary node in the slave cluster, but it performs similar processing to that in Procedure P4 because it has received a hello frame from a node device 10 in the same cluster.

In Procedure P13, the node N5 receives a hello frame from the node N8. The master-table updating unit 33 compares the adjacent cluster count with an adjacent cluster count of a slave sub-gateway candidate in the master cluster table 53 because the node N5 is a boundary node in the master cluster. At this point, as illustrated in the master cluster table 53_8, a sub-gateway of the slave cluster is the node N6, and the adjacent cluster count of the node N6 is 0. Then, the node N5 determines that the node N8 has a better condition for a sub-gateway than the node N6, and changes the master cluster table 53 as illustrated in a master cluster table 53_13 (FIG. 11).

In Procedure P14, the node N4, too, receives a hello frame from the node N8. The node N4 does not recognize that it is a boundary node between the cluster C7 and the cluster C1 unless it receives a hello frame from the node N8. Then, processing performed in the node N4 is similar to the processing described in Procedure P2. When the processing in the node N4 is performed, a master cluster table 53 held by the node N4 becomes as illustrated in a master cluster table 53_14 (FIG. 12A).

In Procedure P15, the node N3, too, receives a hello frame from the node N8. The relay-destination determining unit 43 compares the adjacent cluster count with an adjacent cluster count of a slave sub-gateway candidate in the master cluster table 53 because the node N3 is a sub-gateway in the master cluster. At this point, as illustrated in the master cluster table 53_2 (FIG. 10A), a sub-gateway of the slave cluster is the node N6, and the adjacent cluster count of the node N6 is 0 in the master cluster table 53 of the node N3. Then, the node N3 determines that the node N8 has a better condition for a sub-gateway than the node N6, and changes the sub-gateway from the node N6 to the node N8. It further changes the slave sub-gateway candidate to the node N8. Thus, the master cluster table 53 of the node N3 becomes as illustrated in a master cluster table 53_15 (FIG. 12B).

In Procedure P16, next, the node N5 generates a hello frame. Processing of generating a hello frame is performed as described in Procedure P5. The master cluster table 53 of the node N5 when a hello frame is generated is as illustrated in the master cluster table 53_13 (FIG. 11). Thus, the generated hello frame includes the following information elements:
Type: Hello frame
GS: Node N5
LS: Node N5
Cluster ID in cluster information: C1
Sub-gateway in cluster information: Node N3
Adjacent cluster count: 1
Master cluster information
   Adjacent cluster ID: C7
   Node ID of slave sub-gateway: N6
   Node ID of leader node: N3
   Sequence number of leader node: 1
   Node ID of sub-gateway: N3
   Sequence number of sub-gateway: 1
   Adjacent cluster count of sub-gateway: 1
   Sub-gateway candidate: null
   Adjacent cluster count of Sub-gateway candidate: 0
In Procedure 15, the node N3 decides to change the sub-gateway of the slave cluster from the node N6 to the node N8, but the node N3 does not transmit a hello frame after deciding to make the change in a sub-gateway. Thus, the node devices 10 other than the node N3 do not recognize that the sub-gateway is changed in the slave cluster. Accordingly, the node N5 generates a hello frame in which the node N6 is set as a node ID of a slave sub-gateway. The hello frame is transmitted to a node device 10 adjacent to the node N5.

In Procedure P17, the node N3 receives a hello frame from the node N5. The sub-gateway selector 42 of the node N3 determines that the master sub-gateway is not changed because the hello frame received from the node N5 does not include a sub-gateway candidate. Accordingly, the master cluster table 53 is not changed.

In Procedure P18, when receiving a hello frame from the node N5, the slave-table updating unit 32 of the node N6 determines, by use of the slave cluster table 54, whether the source of the hello frame is a sub-gateway of the master cluster. At this point, the slave cluster table 54 of the node N6 is as illustrated in the slave cluster table 54_9 (FIG. 11). Thus, the slave-table updating unit 32 determines that the node N5 is not a sub-gateway of the master cluster. Then, the slave-table updating unit 32 ends the processing.

In Procedure P19, when receiving a hello frame from the node N5, the slave-table updating unit 32 of the node N8 determines that the source of the hello frame is not a sub-gateway of the master cluster. The node N8 ends the processing because it does not operate as a sub-gateway.

In Procedure P20, next, the node N4 generates a hello frame. Processing of generating a hello frame is performed as described in Procedure P5. In this case, the node N4 generates a hello frame including the following information elements because the node N4 recognizes that the node N4 is a leader node and holds the master cluster table 53_14 (FIG. 12A):
Type: Hello frame
GS: Node N4
LS: Node N4
Cluster ID in cluster information: C1
Sub-gateway in cluster information: Node N4
Adjacent cluster count: 1
Master cluster information
   Adjacent cluster ID: C7
   Node ID of slave sub-gateway: N8
   Node ID of leader node: N4
   Sequence number of leader node: 1
   Node ID of sub-gateway: N4
   Sequence number of sub-gateway: 1
   Adjacent cluster count of sub-gateway: 1
   Sub-gateway candidate: null
   Adjacent cluster count of Sub-gateway candidate: 0
The hello frame is transmitted to a node device 10 adjacent to the node N4.

In Procedure P21, the node N3 receives a hello frame from the node N4. Processing in the node N3 is performed as in Procedure P17, and the master cluster table 53 is not changed.

In Procedure P22, the node N8 receives a hello frame from the node N4. In the node N8, processing is performed as in Procedure P9. Accordingly, the node N8 generates a slave cluster table 54_22 (FIG. 12C). Thus, in Procedure P22, both nodes N3 and N4 are a master sub-gateway in the master cluster (C1), and both nodes N6 and N8 are a slave sub-gateway in the slave cluster (C7).

In Procedure P23, next, the node N6 generates a hello frame again. In this case, the generated hello frame includes the following information:
Type: Hello frame
GS: Node N6
LS: Node N6
Cluster ID in cluster information: C7
Sub-gateway in cluster information: Node N6
Master cluster information: null
Adjacent cluster count: 1
The hello frame is transmitted to a node device 10 adjacent to the node N6.

In Procedure P24, when receiving a hello node from the node N6, the node N3 performs processing as in Procedure P15. At this point, as illustrated in the master cluster table 53_15 (FIG. 12B), a sub-gateway of the slave cluster is the node N8, and the adjacent cluster count of the node N8 is 1. On the other hand, it is reported by the hello frame that the adjacent cluster count of the node N6 is also 1. The relay-destination determining unit 43 sets as a slave sub-gateway the N6 that is a node having a relatively small number in the node ID because their adjacent cluster counts are the same. Further, the relay-destination determining unit 43 also changes the slave sub-gateway candidate to the node N6. Thus, the master cluster table 53 becomes as illustrated in a master cluster table 53_24 (FIG. 13A).

In Procedure P25, the node N5 receives a hello frame from the node N6. Processing is performed as in Procedure P13 because the node N5 is a boundary node in the master cluster. Accordingly, the node N5 determines that the node N6 has a better condition than the node N8 for a sub-gateway, and changes the master cluster table 53 as illustrated in a master cluster table 53_25 (FIG. 13B).

In Procedure P26, when receiving a hello node from the node N6, the nodes N7 and N8 perform the processing described in Procedure P4. Further, both nodes N7 and N8 recognize that the node N6 operates as a sub-gateway in the cluster C7 if their cluster managing units 21 process cluster information. Accordingly, the node N7 recognizes the node N6 as a sub-gateway in the cluster C7, and the node N8 recognizes the nodes N6 and N8 as a sub-gateway in the cluster C7.

In Procedure P27, the node N3 transmits a hello frame again to an adjacent node. In this case, the transmitted hello frame includes the same information elements as in Procedure P5 except for a sequence number.

In Procedure P28, when receiving a hello node from the node N3, the node N4 performs processing as the node N5 does in Procedure P8. In this case, a master-table updating unit 33 of the node N4 also updates the information on a slave sub-gateway. Accordingly, the master cluster table 53 of the node N4 is updated as illustrated in a master cluster table 53_28 (FIG. 13C). Thus, the cluster managing unit 21 of the node N4 recognizes that a sub-gateway in the cluster C1 is the node N3.

In Procedure P29, when receiving a hello frame from the node N3, the node N5 performs the processing described in Procedure P8. In this case, nothing is updated in the master cluster table 53 of the node N5 except for the sequence number.

In Procedure P30, when receiving a hello frame from the node N3, the slave-table updating unit 32 of the node N6 determines, by use of the slave cluster table 54, that the source of the hello frame is a master sub-gateway. The slave-table updating unit 32 determines that the setting of the sub-gateway of the slave cluster is not changed, and ends the processing.

In Procedure P31, when receiving a hello frame from the node N3, the slave-table updating unit 32 of the node N8 determines whether the source of the hello frame is registered in the slave cluster table 54 as a master sub-gateway. At this point, the node N8 holds the slave cluster table 54_22 (FIG. 12C) in which a master sub-gateway is the node N4. Accordingly, on the basis of the hello frame received from the node N3, the slave-table updating unit 32 does not update the slave cluster table 54.

In Procedure P32, the node N8 transmits a hello frame again. In this case, the generated hello frame includes the following information:
Type: Hello frame
GS: Node N8
LS: Node N8
Cluster ID in cluster information: C7
Sub-gateway in cluster information: Node N8
Master cluster information: null
Adjacent cluster count: 1
All the nodes N3 to N5 process the hello frame from the node N8, but there is no change in information in the master cluster table 53 in any of the node devices 10.

In Procedure P33, the node N5 transmits a hello frame again. The node N3 processes the hello frame from the node N5, but there is no change in information in the master cluster table 53. The nodes N6 and N8, too, process the hello frame from the node N5, but there is no change in information in their slave cluster tables 54.

In Procedure P34, the node N4 transmits a hello frame again. The node N3 processes the hello frame from the node N4, but there is no change in information in the master cluster table 53.

When receiving a hello frame from the node N4, the node N8 determines whether the source of the hello frame is registered in the slave cluster table 54 as a master sub-gateway. At this point, the node N8 holds information as illustrated in the slave cluster table 54_22 (FIG. 12C) in which a master sub-gateway is the node N4. Accordingly, the slave-table updating unit 32 acquires a node ID of a sub-gateway of the slave cluster from the master cluster information. The acquired node ID is the ID of the node N6, so the slave-table updating unit 32 determines that the setting of the sub-gateway of the slave cluster has been changed, and ends the processing which it performs as a sub-gateway. Further, the slave-table updating unit 32 changes the slave cluster table 54 as illustrated in FIG. 14. Accordingly, the cluster managing unit 21 of the node N8 recognizes that the node N6 is a sub-gateway in the cluster C7.

Figure 9C:
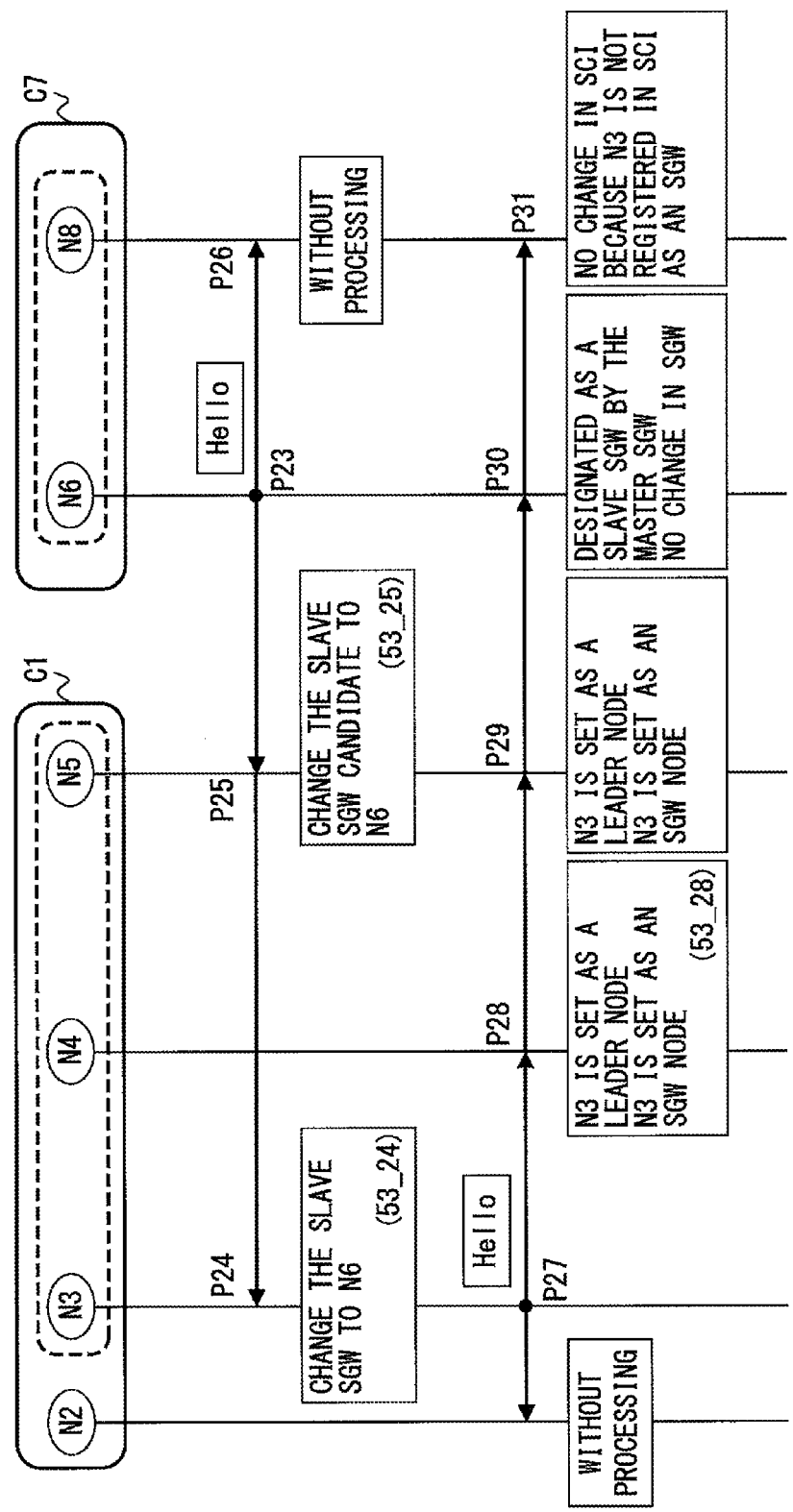
FIG. 9C is a sequence diagram which illustrates exemplary processing according to the first embodiment.
Figure 9D:
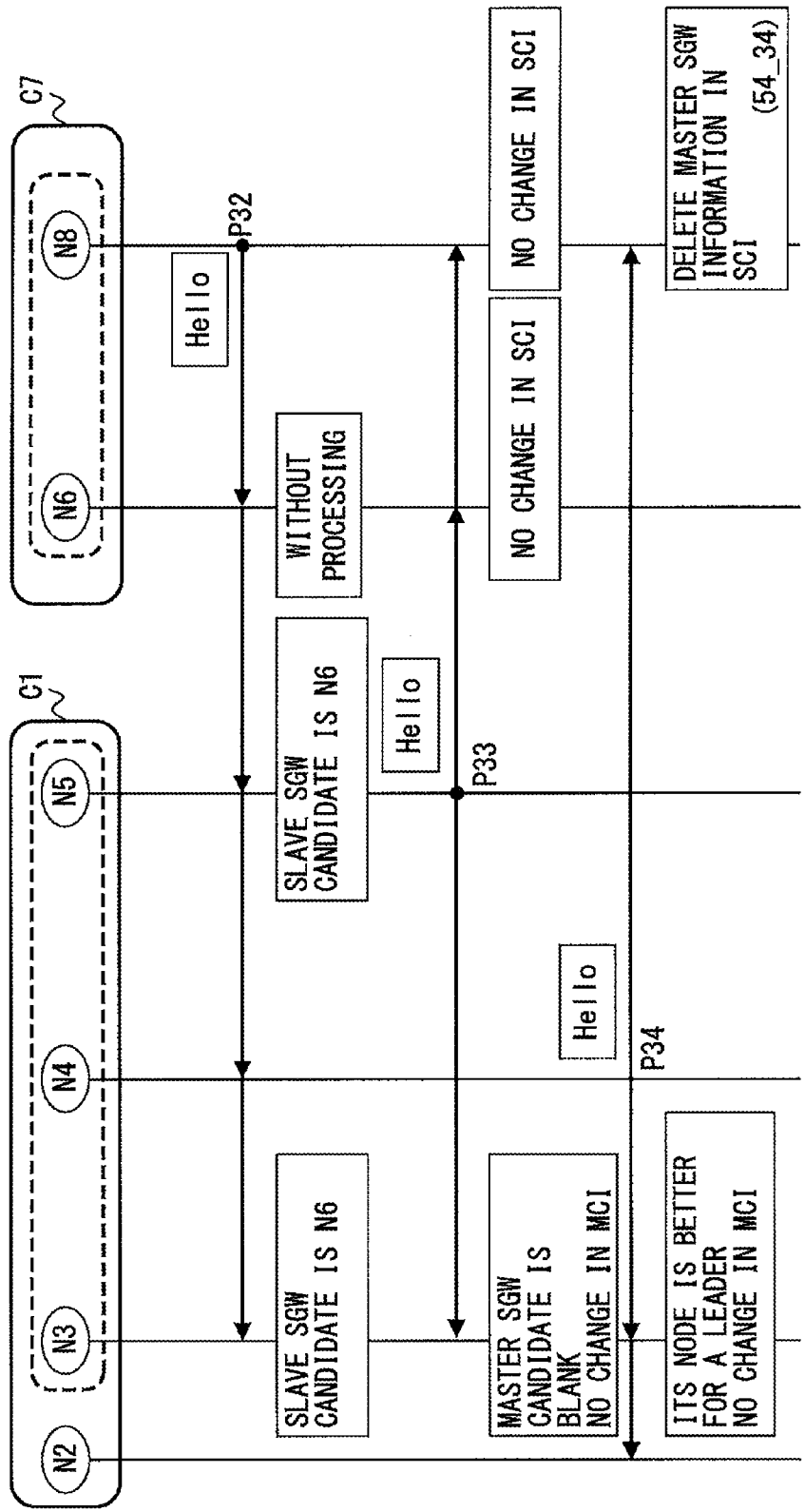
FIG. 9D is a sequence diagram which illustrates exemplary processing according to the first embodiment.

As described with reference to FIGS. 8A to 14, when a sub-gateway is determined, an identifier of a node device 10 that operates as a sub-gateway is included in cluster information in a hello frame. A node device 10 that is not a boundary node can determine, by use of the cluster information in the hello frame, the node device 10 that operates as a sub-gateway in the same cluster as itself. For example, after the process of Procedure P28 in FIG. 9C is performed, all the nodes N3 to N5 transmit a hello frame in which cluster information includes the information indicating that the node N3 operates as a sub-gateway. Accordingly, the node N2 recognizes that the node N3 operates as a sub-gateway in the cluster C1. Further, the node N2 broadcasts a hello frame in which cluster information includes the information indicating that the node N3 is a sub-gateway. Then, by receiving the hello frame from the node N2, the node N1 recognizes that it is possible to communicate with a node device 10 in another cluster via the node N3.

After that, for example, when the node N1 transmits a frame to the node N7, the node N1 decides to transfer the frame toward a sub-gateway because the node N7 is included in a different cluster than the node N1. The node N1 transmits the frame destined for the node N7 toward the node N3 because it has already been reported to the node N1 that the node N3 operates as a sub-gateway. In other words, according to the first embodiment, the node N1 does not have to select from among the boundary nodes a node device 10 that relays a communication between the clusters. Accordingly, it is possible to simplify processing performed by the node N1 from a generation of a frame destined for the node N7 until a determination of a destination to which to transfer the frame. Thus, it is possible to shorten the time for routing the frame destined for the node N7 in the node N1. As is the case with the node N1, when the node N2 that has received a frame destined for the node N7 from the node N1 determines that the node N7 is not included in the cluster C1, it transmits the frame destined for the node N7 to the node N3. Thus, also for the node N2, the method according to the first embodiment may permit a reduction in processing burden compared to the case in which a destination to which to transfer a frame is selected from among the boundary nodes in the cluster C1.

[Method for Changing Sub-Gateways]

FIGS. 15A to 15D are block diagrams which illustrate exemplary methods for changing a sub-gateway. Exemplary methods for changing a sub-gateway that are used when a new cluster is detected will now be described with reference to FIGS. 15A to 15D.

Figure 15A:
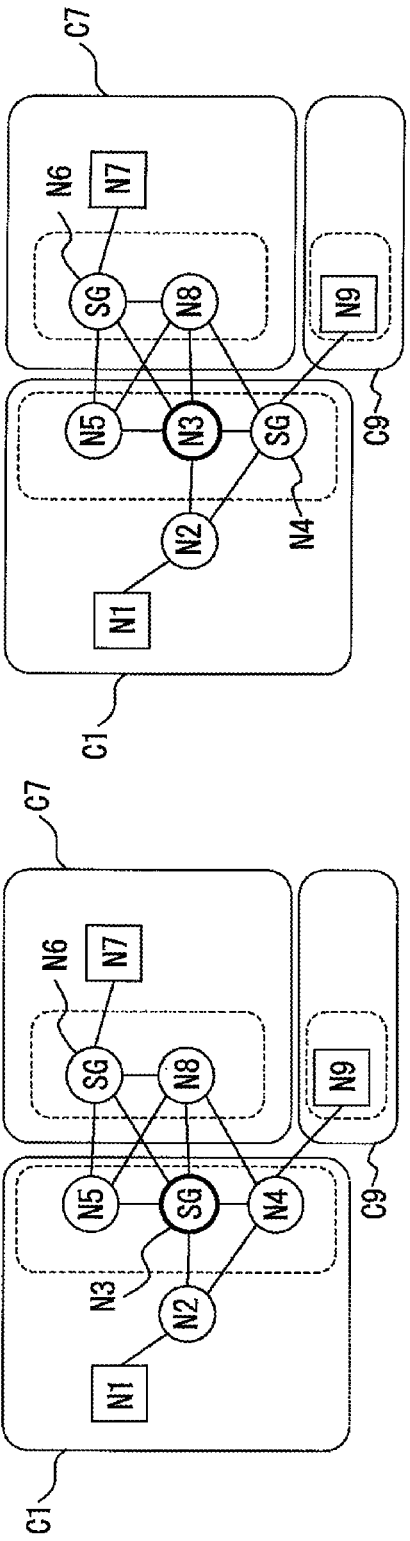
FIGS. 15A to 15D are block diagrams which illustrate exemplary methods for changing sub-gateways.

FIG. 15A illustrates an exemplary method for changing a sub-gateway with reference to an exemplary case in which a node N9 is added to the ad-hoc network illustrated in FIG. 8A and is included in a cluster C9. As illustrated in FIG. 15A, even if the node N9 has joined the ad-hoc network, the setting of a sub-gateway is not changed from the description with reference to FIGS. 8A to 8D if it is before the node N9 transmits a hello frame. FIGS. 16A to 16C illustrate exemplary master cluster tables 53 that are held by the nodes N3 to N5. FIG. 16A is an exemplary master cluster table 53 held by the node N3, FIG. 16B by the node N5, and FIG. 16C by the node N4.

Next, the node N9 transmits a hello frame that includes the following information elements:
Type: Hello frame
GS: Node N9
LS: Node N9
Cluster ID in cluster information: C9
Master cluster information: null
Adjacent cluster count: 0

In the example of FIG. 15A, the node N4 that is an adjacent node of the node N9 receives a hello frame. The node N4 detects the existence of the node N9 and the cluster C9 from the hello frame received from the node N9. Then, the master-table updating unit 33 of the node N4 adds an entry for the cluster C9 in the master cluster table 53. Further, the processing-type determining unit 31 of the node N4 determines that the cluster C1 is a master cluster for the cluster C9 and outputs master cluster information to a leader-node determining unit 41. The leader-node determining unit 41 selects the node N4 as a leader node when setting a sub-gateway between the clusters C1 and C9. Further, a sub-gateway selector 42 determines the node N4 to be a master sub-gateway between the clusters C1 and C9. A relay-destination determining unit 43 determines the node N9 to be a slave sub-gateway.

Further, the node N4 changes the adjacent cluster count of the node N4 from 1 to 2. The sub-gateway selector 42 determines whether the condition of its node has become better than the node device 10 that has been set as a sub-gateway in the cluster C1 between the cluster C1 and a cluster other than the cluster C9 by the change in adjacent cluster count to 2. The sub-gateway used for a communication between the clusters C1 and C4 is the node N3, and the adjacent cluster count of the node N3 is 1. Accordingly, the sub-gateway selector 42 of the node N4 determines that the node N4 has a better condition for a sub-gateway than the node N3. The sub-gateway selector 42 of the node N4 selects the node N4 as a sub-gateway candidate between the clusters C1 and C7 because the node N4 is not a leader node when the node N4 determines a sub-gateway used for a communication between the clusters C1 and C7. The processing permits updating of the master cluster table 53 of the node N4 after receiving the hello frame, as illustrated in FIG. 17A.

Next, the node N4 generates a hello frame. The node N4 includes in the hello frame the information other than a slave sub-gateway candidate from the master cluster table 53 held by the node N4 (see FIG. 17A). Thus, the hello frame includes the information on the cluster C7 and the information on the cluster C9 as master cluster information. The hello frame generated in the node N4 is transmitted to an adjacent node device of the node N4.

When the node N9 receives the hello frame transmitted from the node N4, the node N9 performs processing as performed by the node N6 as described in Procedure P9 with reference to FIG. 9A. Accordingly, a slave cluster table 54 of the node N9 is updated as illustrated in FIG. 17B.

The node N3, too, receives the hello frame transmitted from the node N4. At this point, a master sub-gateway for a communication between the clusters C1 and C7 is the node N3. Accordingly, the sub-gateway selector 42 of the node N3 compares the information on a sub-gateway candidate in the hello frame with the information on the node N3. The adjacent cluster count of the node N3 is 1, and the adjacent cluster count of the node N4 is 2. Accordingly, the sub-gateway selector 42 of the node N3 determines that the node N4 has a better condition for a sub-gateway than the node N3. The sub-gateway selector 42 of the node N3 selects the node N4 as a sub-gateway between the clusters C1 and C7 because the node N3 is a leader node when determining a sub-gateway used for a communication between the clusters C1 and C7. Further, the information on a sub-gateway candidate is not recorded. Accordingly, the master cluster table 53 of the node N3 becomes as illustrated in FIG. 17C.

Further, the node N3 generates a hello frame. The node N3 includes in the hello frame the information other than a slave sub-gateway candidate from the master cluster table 53 held by the node N3 (see FIG. 17C). The hello frame generated by the node N3 is transmitted to an adjacent node device of the node N3.

Figure 15B:
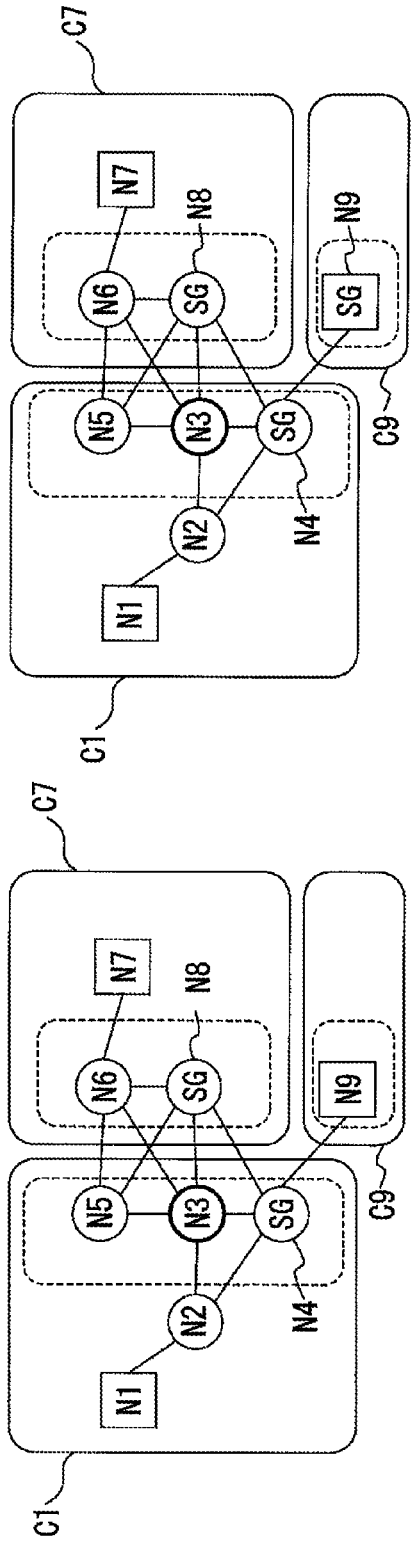

The node N4 receives a hello frame from the node N3. The sub-gateway selector 42 of the node N4 detects that the node N4 has been set as a master sub-gateway in the master cluster information on a communication between the clusters C1 and C7. Then, the node N4 starts operating as a master sub-gateway. Accordingly, a sub-gateway is set as illustrated in FIG. 15B. Further, the master-table updating unit 33 of the node N4 changes the master cluster table 53 as illustrated in FIG. 18A by use of the hello frame.

The node N5 receives a hello frame from the node N3. When detecting that the node N4 has been set as a master sub-gateway, a sub-gateway selector 42 of the node N5 changes the master cluster table 53 as illustrated in FIG. 18B by use of the hello frame.

After that, the node N4 generates a hello frame again. The node N4 includes in the hello frame the information other than a slave sub-gateway candidate from the master cluster table 53 held by the node N4 (see FIG. 18A). The hello frame generated by the node N4 is transmitted to an adjacent node device of the node N4.

Figure 15C:
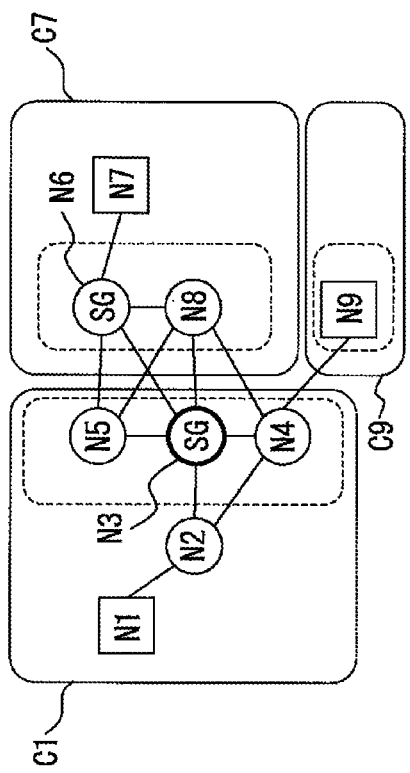

When the node N8 receives the hello frame transmitted from the node N4, the slave-table updating unit 32 of the node N8 detects that the node N8 has been set as a slave sub-gateway for a communication between the clusters C1 and C7. Then, the node N8 starts operating as a slave sub-gateway. Accordingly, a sub-gateway is set as illustrated in FIG. 15C.

When the node N3 receives the hello frame transmitted from the node N4, a master-table updating unit 33 of the node N3 performs processing of an entry for the cluster C7. The master-table updating unit 33 detects that the node N8 has been determined to be a slave sub-gateway of the node N8. Then, the node N3 updates the information on a slave sub-gateway and updates the master cluster table 53 as illustrated in FIG. 19A.

Figure 15D:
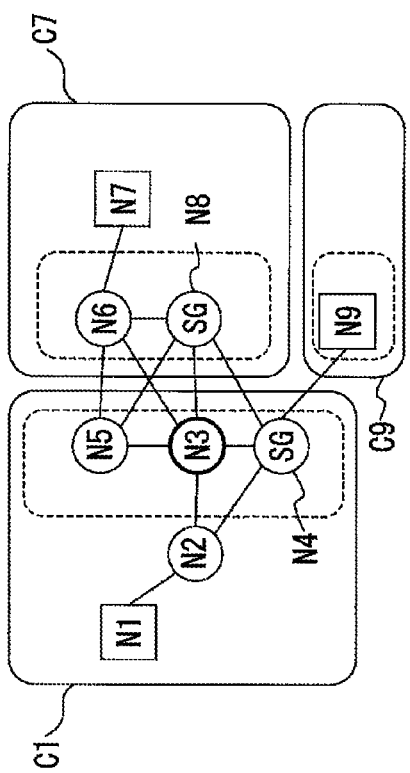

When the node N9 receives the hello frame transmitted from the node N4, a slave-table updating unit 32 of the node N9 detects that the node N9 has been set as a slave sub-gateway. Then, the node N9 starts operating as a slave sub-gateway. Accordingly, a sub-gateway is set as illustrated in FIG. 15D.

After that, when the node N3 generates a hello frame, the information other than a sub-gateway candidate that is included in FIG. 19A is reported to an adjacent node of the node N3. Then, the node N5 recognizes that a node that operates as a slave sub-gateway upon a communication between the clusters C1 and C7 is the node N8. Accordingly, the master cluster table 53 of the node N5 is changed as illustrated in FIG. 19B.

Figure 20:
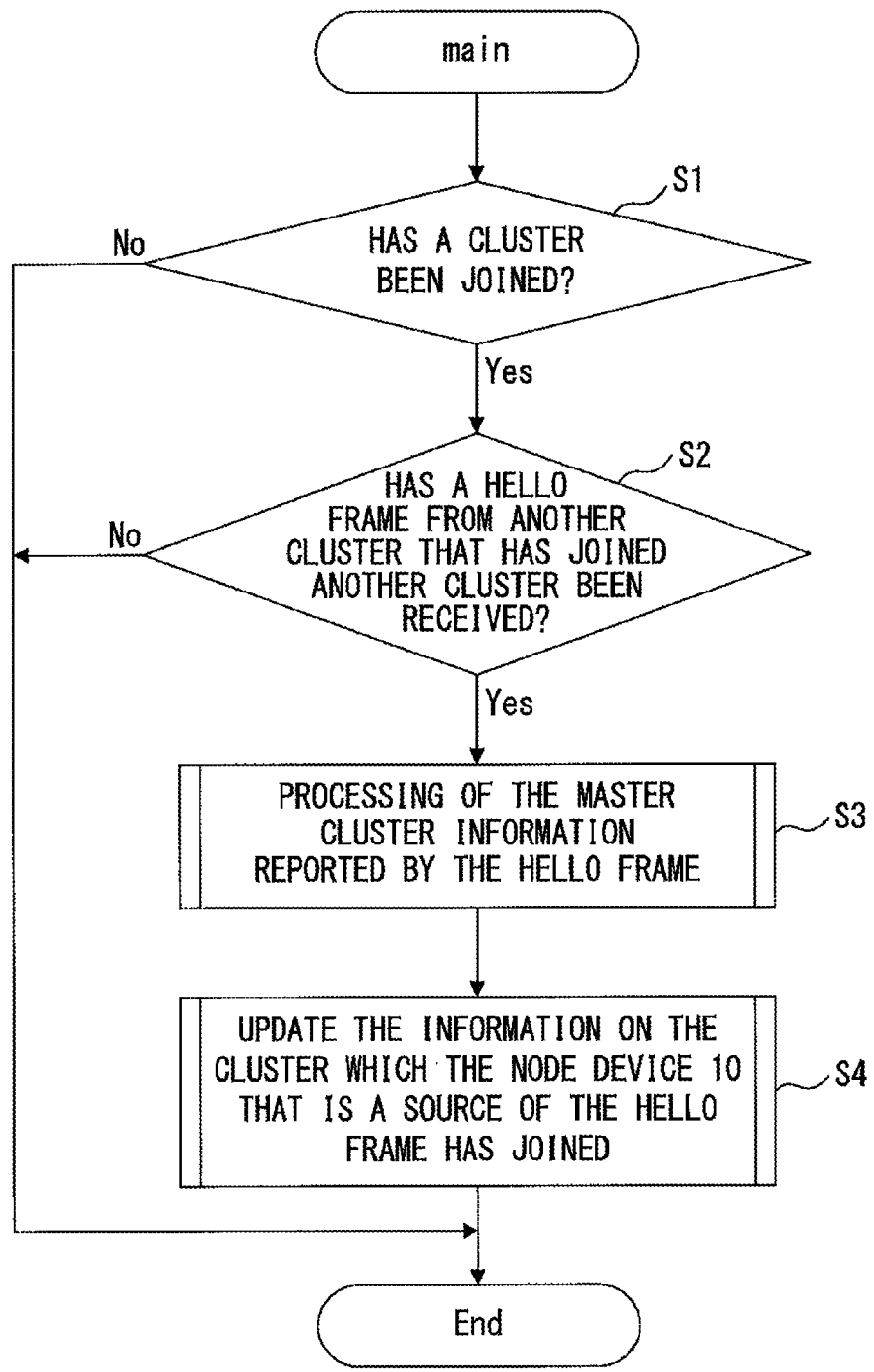
FIG. 20 is a flowchart which illustrates exemplary processing performed in a node device.

FIG. 20 is a flowchart which illustrates exemplary processing performed in a node device 10. The order of Steps S3 and S4 may be changed depending on implementation. A node device 10 determines whether it has joined a cluster (Step S1). Anode device 10 that has joined any cluster determines whether it has received a hello frame from another node device 10 that has joined another cluster (Yes at Step S1, Step S2). When the node device 10 has received a hello frame from another node device 10 that has joined another cluster, the node device 10 processes master cluster information reported by the hello frame (Yes at Step S2, Step S3). Further, when the node device 10 is a node device 10 in a master cluster, it updates the information on the cluster which the node device 10 that is a source of the hello frame has joined (Step S4).

FIGS. 21A and 21B are a set of flowcharts which illustrate exemplary processing of the received master cluster information. FIGS. 21A and 21B are exemplary processing performed by a node device 10 that has received a hello frame. A processing-type determining unit 31 determines whether the received hello frame includes master cluster information (Step S11). When the hello frame does not include the master cluster information, the processing-type determining unit 31 determines that it did not receive a hello frame from a boundary node included in the master cluster, and ends the processing of the master cluster information (No at Step S11). On the other hand, when the hello frame includes the master cluster information, the processing-type determining unit 31 sets a variable n to 1 (Step S12). The processing-type determining unit 31 tries to acquire an nth entry from the master cluster information. The entry included in the master cluster information will hereinafter be referred to as an "MCI entry". When it is not possible to acquire the nth MCI entry, the processing-type determining unit 31 ends the processing of the master cluster information (No at Step S13).

When acquiring an nth MCI entry, the processing-type determining unit 31 determines whether its node has joined the same cluster as the source of the hello frame (Yes at Step 13, Step S14). A leader-node determining unit 41 of a node device 10 that has joined the same cluster as the source of the hello frame tries to acquire from a master cluster table 53 an entry having the same cluster ID as the MCI entry to be processed (Yes at Step S14, S15). When it succeeds in acquiring the entry, the leader-node determining unit 41 compares the node ID of a leader node that is included in the MCI entry to be processed with the node ID of a leader node that is set in the master cluster table 53 (Yes at Step S16, Step S17). When the number in the node ID of a leader node that is included in the MCI entry to be processed is smaller, the leader-node determining unit 41 determines that a better leader node has been reported, and changes the leader node (Yes at Step S17, Step S18). After that, the master sub-gateway (SGW) is updated by a sub-gateway selector 42 (Step S19). On the other hand, when the leader-node determining unit 41 determines that a better leader node has not been reported, the master sub-gateway is updated without changing the leader node (No at Step S17, Step S19). After that, the processing-type determining unit 31 increments n by one and performs the processes of and after Step S13 (Step S20).

Referring to FIG. 21B, processing that is performed when it has been determined to be No at Step S14 will now be described. In a node device 10 that has not joined the same cluster as the source of the hello frame, a slave-table updating unit 32 determines whether the slave cluster in the MCI entry to be processed is the cluster of its node (Step S31). When the slave cluster in the MCI entry to be processed is not the cluster of its node, the processing-type determining unit 31 determines that it has acquired an MCI entry that includes the information to determine a sub-gateway used for a communication between an adjacent cluster and another cluster. Then, the processing-type determining unit 31 determines that the acquired MCI entry is not to be processed and discards it (No at Step S31, Step S32).

When the slave cluster is the cluster of its node, the slave-table updating unit 32 acquires an entry associated with the same cluster ID as that of the MCI entry to be processed from a slave cluster table 54 (Yes at Step S31, Step S33). Next, the slave-table updating unit 32 determines whether its node has been designated as a slave sub-gateway in the MCI entry to be processed (Step S34). When its node has not been designated as a slave sub-gateway, the slave-table updating unit 32 determines whether the source of the hello frame is recorded as a master sub-gateway in the slave cluster table 54 (No at Step S34). When there is an entry in which the source of the hello frame is a sub-gateway, the slave-table updating unit 32 deletes the entry from the slave cluster table 54 (Step S36). On the other hand, when a slave sub-gateway in the MCI entry to be processed is its node, the slave-table updating unit 32 determines whether the source of the hello frame is the sub-gateway of the master cluster (Yes at Step S34, Step S35). When the source of the hello frame is the sub-gateway of the master cluster, the slave-table updating unit 32 sets its node as a sub-gateway of the slave cluster (Yes at Step S35, Step S37). On the other hand, when the source of the hello frame is not the sub-gateway of the master cluster, the slave-table updating unit 32 determines whether the source of the hello frame is recorded as a master sub-gateway (No at Step S35). When the source of the hello frame is the sub-gateway of the master cluster, the process of Step S36 is performed.

Figure 22:
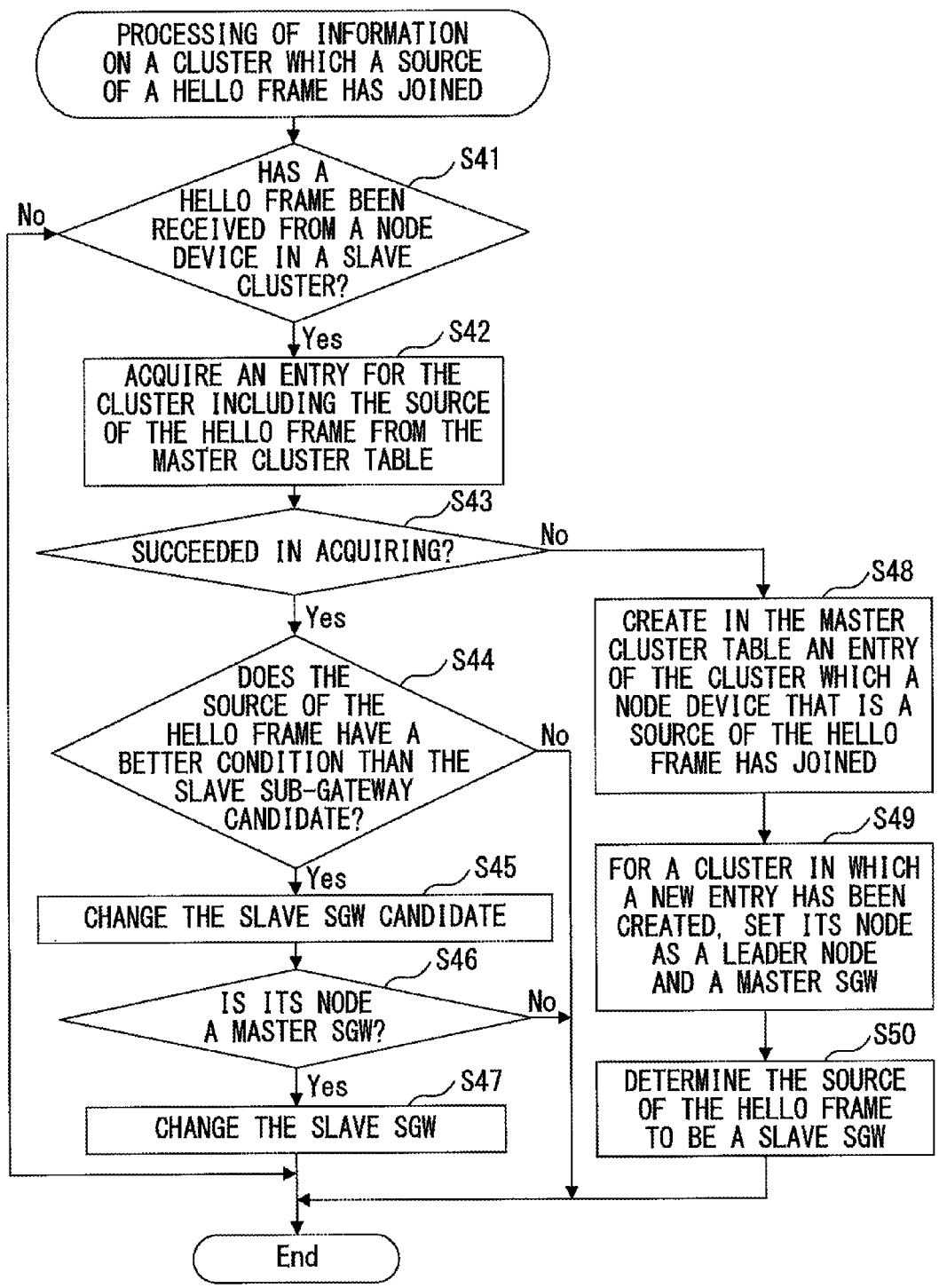
FIG. 22 is a flowchart which illustrates exemplary processing of information on a cluster which a source of a hello frame has joined.

FIG. 22 is a flowchart which illustrates exemplary processing of information on a cluster which a source of a hello frame has joined. The processing-type determining unit 31 determines whether it has received a hello frame from a node device 10 in a slave cluster (Step S41). When a hello frame has been received from a node device 10 in the slave cluster, a master-table updating unit 33 tries to acquire an entry for the cluster which the source of the hello frame has joined from the master cluster table 53 (Step S42). When it succeeds in acquiring the entry, the master-table updating unit 33 compares the condition of the source of the hello frame with the condition of the slave sub-gateway candidate in the master cluster table 53 (Yes at Step S43, Step S44). When the source of the hello frame has a better condition than the slave sub-gateway candidate, the master-table updating unit 33 changes the slave sub-gateway candidate (Yes at Step S44, Step S45). Further, the sub-gateway selector 42 determines whether its node is a sub-gateway of a master cluster (Step S46). When its node is a sub-gateway of the master cluster, the sub-gateway selector 42 changes the slave sub-gateway (Yes at Step S46, Step S47). On the other hand, when its node is not a sub-gateway of the master cluster, the sub-gateway selector 42 ends the processing (No at Step S46). When the source of the hello frame does not have a better condition than the slave sub-gateway candidate, the master-table updating unit 33 ends the processing (No at Step S44). Further, when it has been determined to be No at Step S41, the processing-type determining unit 31 ends the processing.

When it fails to acquire the entry at Step S43, the master-table updating unit 33 generates in the master cluster table 53 an entry for the cluster which a node device 10 that is a source of the hello frame has joined (Step S48). For a cluster in which a new entry was generated, the leader-node determining unit 41 sets its node as a leader node. Further, for the cluster in which a new entry was generated, the sub-gateway selector 42 sets its node as a master sub-gateway (Step S49). Furthermore, a relay-destination determining unit 43 sets the source of the hello frame as a sub-gateway of the slave cluster (Step S50).

Figure 23:
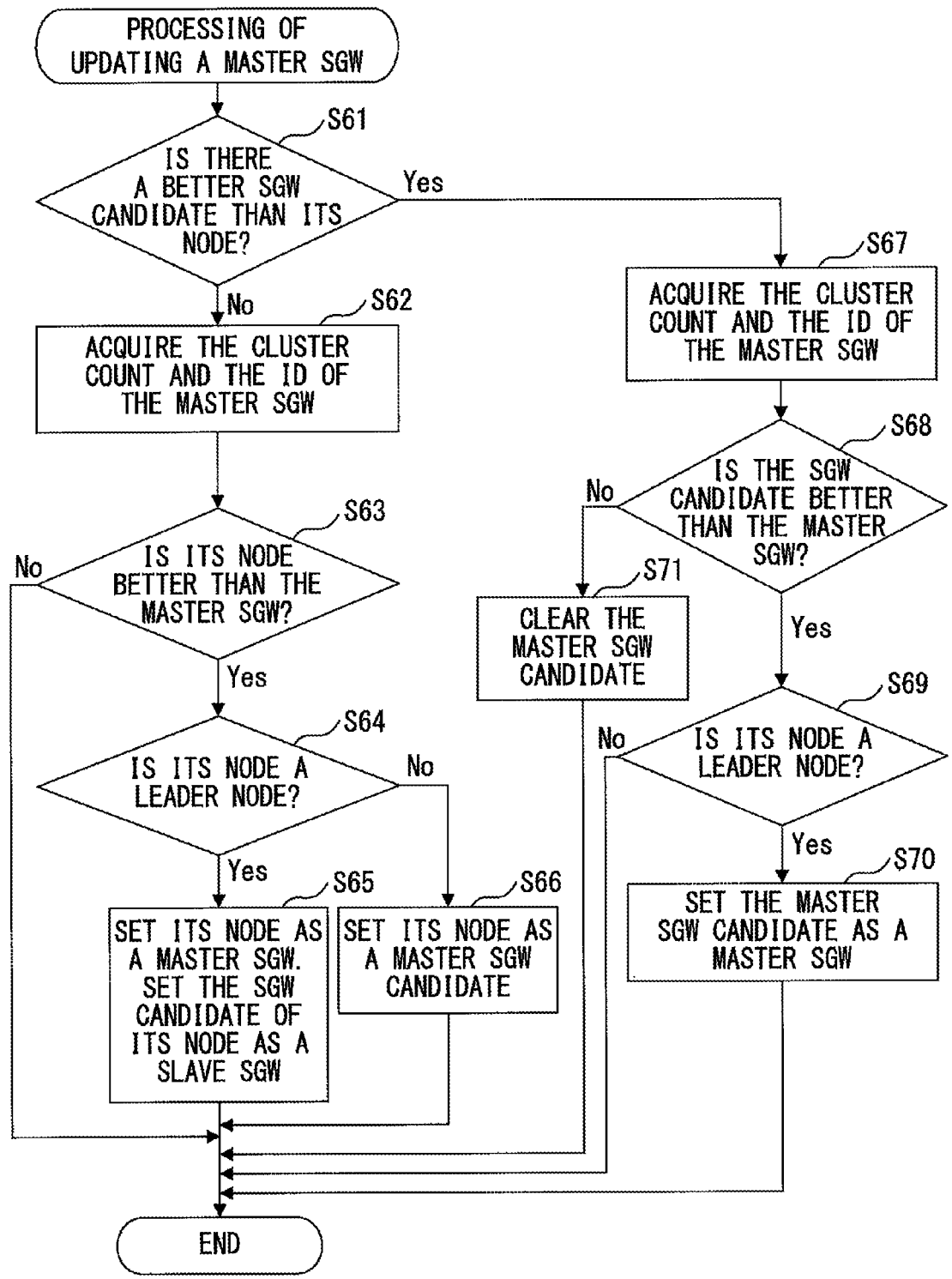
FIG. 23 is a flowchart which illustrates exemplary processing of updating a master sub-gateway.

FIG. 23 is a flowchart which illustrates exemplary processing of updating a master sub-gateway. The sub-gateway selector 42 determines whether an MCI entry to be processed includes information on a sub-gateway candidate that has a better condition than its node (Step S61). When the information on a sub-gateway candidate that has a better condition than its node is not included, the sub-gateway selector 42 acquires the adjacent cluster count and the node ID of the node device 10 which has been set as a master sub-gateway at present (Step S62). The sub-gateway selector 42 compares the condition of the node device 10 that has been set as a master sub-gateway at present with that of its node, and determines whether its node has a better condition than the present master sub-gateway (Step S63). When its node has a better condition, the sub-gateway selector 42 determines whether its node is a leader node (Step S64). When its node is a leader node, the sub-gateway selector 42 changes the master sub-gateway to its node, and changes the master cluster table 53 appropriately (Yes at Step S64, Step S65). For example, the sub-gateway selector 42 changes a value of an adjacent cluster and a sequence number of the sub-gateway of the master cluster to the values of its node. Further, it sets the slave sub-gateway candidate included in the master cluster table 53 held by its node as a slave sub-gateway. On the other hand, when its node is not a leader node, the sub-gateway selector 42 sets its node as a master sub-gateway candidate (Step S66). When it is determined at Step S63 that its node does not have a better condition than the presently set master sub-gateway, the sub-gateway selector 42 ends the processing.

Next, the processing when it has been determined at Step S61 that the MCI entry to be processed includes the information on a sub-gateway candidate that has a better condition than its node will now be described. Also in this case, the sub-gateway selector 42 acquires the adjacent cluster count and the node ID of the node device 10 that has been set as a master sub-gateway at present (Step S67). The sub-gateway selector 42 determines whether the sub-gateway candidate has a better condition than the node device 10 set as a master sub-gateway at present (Step S68). When the sub-gateway candidate has a better condition, the sub-gateway selector 42 determines whether its node is a leader node (Yes at Step S68, Step S69). When its node is a leader node, the sub-gateway selector 42 changes the master sub-gateway to the node device reported as a sub-gateway candidate, and changes the master cluster table 53 appropriately (Yes at Step S69, Step S70). For example, the sub-gateway selector 42 changes a value of an adjacent cluster and a sequence number of the sub-gateway of the master cluster to the values of the sub-gateway candidate. On the other hand, when its node is not a leader node, the sub-gateway selector 42 ends the processing (No at Step S69). When it has been determined at Step S68 that the sub-gateway candidate does not have a better condition than the presently set master sub-gateway, the sub-gateway selector 42 does not store the information on the sub-gateway candidate (Step S71).

It is possible to determine a sub-gateway flexibly with an increase or decrease in the number of clusters and with an addition of node device 10 because a boundary node performs processing as described with reference to FIGS. 20 to 23.

As described with reference to FIGS. 15A to 23, an identifier of a node device 10 that operates as a sub-gateway is included in cluster information in a hello frame despite a change in a sub-gateway because of an addition of a cluster or an increase or decrease in the number of node devices 10. Accordingly, a node device 10 that is not a boundary node, too, determines that the sub-gateway has been changed and determines the sub-gateway after the change. For example, in the example of FIG. 15D, any node device 10 in the cluster C1 can determine from a hello frame that a frame destined for a node device 10 included in the cluster C7 or C9 is to be transmitted to the node N4. Accordingly, a node device in a cluster does not have to select from among the boundary nodes a destination to which to transfer the frame destined for a node device 10 in another cluster at every frame transfer. Thus, a burden in transfer processing in each node device 10 is reduced.

An exemplary method for designating a relay-destination of a frame will now be described. For example, the node N1 tries to transmit a data frame to the node N7. FIG. 24A illustrates an exemplary data frame generated by a data-frame processing unit 15 of the node N1. The data frame includes data to be transmitted, type information, a global destination address, a global source address, a local destination address, and a local source address. When transferring a frame destined for a node device 10 that is not included in the cluster C1, a transfer processing unit 27 of the node N1 adds sub-gateway information (SGW information) to the frame. FIG. 24B illustrates a data frame that includes sub-gateway information. In this case, the address of the node N4 is set as sub-gateway information because it has been reported in advance that a sub-gateway of the cluster C1 is the node N4. The sub-gateway information is treated similarly to the global destination when a communication is made in the cluster. For example, the node N2 determines to transfer the received frame to the N4 by checking the sub-gateway information on the frame received from the node N1. In this case, a transfer processing unit 27 of the node N2 transfers the data frame to the node N4 after changing the local destination address and the local source address in the frame. The node N4 deletes the sub-gateway information from the received frame when determining that the address set as sub-gateway information is the address assigned to the node N4. Further, the node N4 transfers the frame from which the sub-gateway has been deleted to a sub-gateway of an adjacent cluster. When one cluster includes a plurality of sub-gateways, the address to be designated as sub-gateway information may be a multicast address that designates all the sub-gateways in one cluster. Even if a frame is multicast transmitted to all the sub-gateways in one cluster, congestion does not occur easily because the number of sub-gateways is less than the number of boundary nodes.

The method according to the first embodiment is applicable when a sub-gateway holds the information on the route to a node device 10 that is a relay-destination of a frame and is also applicable when a sub-gateway does not hold any route information but that of its cluster. When a sub-gateway holds the route information in a cluster of a relay-destination, the number of cases in which a plurality of node devices 10 redundantly store therein the route information of the other clusters increases as the number of node devices 10 that operate as a sub-gateway increases. For example, in FIG. 8A, when all the nodes N3 to N5 in the cluster C1 relay a communication between the clusters C1 and C7, all the nodes N3 to N5 hold the route information of the clusters C1 and C7. Likewise, when the method according to the first embodiment is not applied, the nodes N6 and N8 both hold the route information of the clusters C1 and C7. However, in the network illustrated in FIG. 8A, it is enough if the nodes N3 and N6 hold the route information of the clusters C1 and C7 in order to relay a communication between the clusters by applying the first embodiment. Thus, the route information of the other clusters is not redundantly stored in the plurality of node devices 10, and as a result, a memory held by a node device is used efficiently according to the first embodiment.

Further, by the method according to the first embodiment, a node device 10 that relays a communication between clusters is autonomously selected from among the boundary nodes. Accordingly, the method according to the first embodiment can also be used for a large-scale network including a number of nodes or when the setting of a cluster is changed frequently.

Second Embodiment

As a second embodiment, a case in which a node device 10 that has joined an ad-hoc network determines whether a failure has occurred in an adjacent node device 10 and changes sub-gateways dynamically when detecting a failure will now be described.

According to the second embodiment, a boundary node in a master cluster determines whether a failure has occurred in a leader node, by monitoring intervals of receiving a hello frame from the leader node. When a failure has occurred in the leader node, the boundary node in the master cluster changes the leader node. For example, a boundary node that detected a failure in a leader node changes the leader node by transmitting to an adjacent node a hello frame in which its node has been designated as a leader node.

The leader node determines whether a failure has occurred in a master sub-gateway, by monitoring intervals of transmitting a hello frame from the master sub-gateway. When detecting a failure in the master sub-gateway, the leader node newly sets a master sub-gateway. For example, the leader node can select a master sub-gateway by transmitting a hello frame in which its node has been set as a sub-gateway.

The master sub-gateway determines whether a failure has occurred in a slave sub-gateway, by monitoring intervals of receiving a hello frame from the slave sub-gateway. When a failure has occurred in the slave sub-gateway, the master sub-gateway changes the slave sub-gateway if another adjacent node can be set as a slave sub-gateway. On the other hand, when there is not any other node device that can be set as a slave sub-gateway, the master sub-gateway determines that it is no longer a boundary node. Then, it deletes the entry for the cluster that is no longer adjacent from a master cluster table 53. After that, the node device 10 that has been designated as a master sub-gateway reports, using a hello frame, to a boundary node in the master cluster that it is no longer a boundary node. Then, the leader node newly resets the master sub-gateway.

Further, a node device 10 in a slave cluster, too, can detect a failure in a sub-gateway of the master cluster by monitoring a frequency of receiving a hello frame from the sub-gateway of the master cluster. When detecting a failure in the sub-gateway of the master cluster, the sub-gateway of the slave cluster deletes from a slave cluster table 54 an entry that sets therein a node in which a failure was detected as a sub-gateway.

In order to perform the above processing, a node device 10 includes a master cluster table 61 instead of the master cluster table 53, and a slave cluster table 62 instead of the slave cluster table 54.

FIG. 25 illustrates an exemplary master cluster table 61 used in the second embodiment. In addition to the information elements included in the master cluster table 53, the master cluster table 61 includes time to lives (TTL) for a master sub-gateway, a slave sub-gateway, and a leader node. A master-table updating unit 33 compares a sequence number of a leader node included in a hello frame with a sequence number of a leader node in the master cluster table 61. As a result of the comparison, when the sequence number in the hello frame is greater, the master-table updating unit 33 determines that the leader node has transmitted the hello frame normally and resets the TTL of a leader node. The default of TTL is any positive integer. On the other hand, if the sequence number in the hello frame is not greater than the value recorded in the master cluster table 61, the master-table updating unit 33 determines that it has received the already received hello frame again, and does not process the hello frame. The master-table updating unit 33 decrements the value of the TTL for a leader node by one at regular time intervals, and determines that a failure has occurred in the leader node when the value of the TTL becomes 0. The master-table updating unit 33 resets the value of the TTL of a leader node when the leader node has been newly set.

The master-table updating unit 33 also updates the value of the TTL for a master sub-gateway in a similar way to the case with the leader node. The leader node resets the value of the TTL when the sub-gateway selector 42 newly sets the master sub-gateway.

A master-table updating unit 33 of a master sub-gateway resets the value of the TTL for a slave sub-gateway when receiving a hello frame from the slave sub-gateway. The master sub-gateway and the slave sub-gateway are adjacent to each other, so it is unlikely that the processed hello frame will be received again. Accordingly, the master-table updating unit 33 of the master sub-gateway does not have to monitor a hello frame received from the slave sub-gateway. The master-table updating unit 33 decrements the value of the TTL for a slave sub-gateway by one at regular time intervals, and determines that a failure has occurred in the slave sub-gateway when the value of the TTL becomes 0.

FIG. 26 illustrates an exemplary slave cluster table 62 used in the second embodiment. The slave cluster table 62 includes a TTL of a master cluster and a TTL of a slave cluster. A slave-table updating unit 32 extracts the cluster information of a hello frame received from a node device 10 in an adjacent cluster and compares it with the entry in the slave cluster table 62. Regarding the entry in the cluster identified by a cluster ID in the hello frame, the slave-table updating unit 32 resets the TTL for a master cluster. The slave-table updating unit 32 decrements the value of the TTL for a master cluster by one at regular time intervals, and determines that the master cluster has disappeared or its node is no longer an adjacent node when the value of the TTL becomes 0. The slave-table updating unit 32 deletes from the slave cluster table 62 an entry for the master cluster whose value of the TTL has become 0.

A slave-table updating unit 32 in the slave cluster resets the value of the TTL for a sub-gateway of the master cluster when receiving a hello frame from the sub-gateway of the master cluster. The slave-table updating unit 32 decrements the value of the TTL for a master sub-gateway by one at regular time intervals, and determines that a failure has occurred in the master sub-gateway when the value of the TTL becomes 0. The slave-table updating unit 32 deletes from the slave cluster table 62 an entry for the master sub-gateway whose value of the TTL has become 0.

Figures 27A, 27B, 27C:
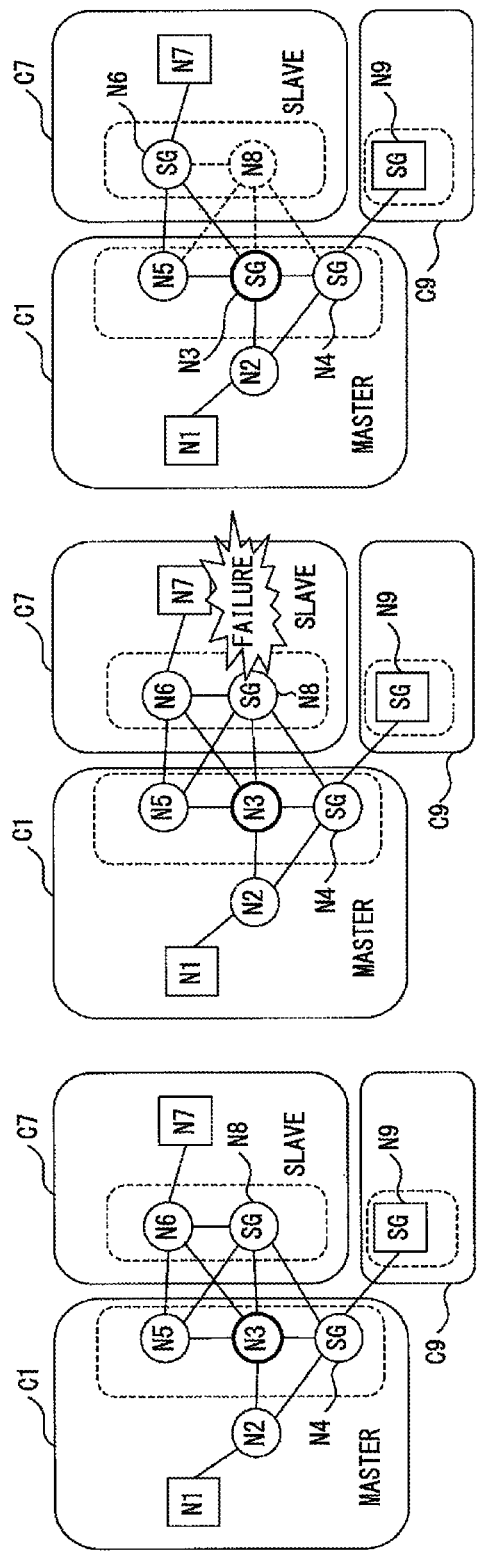
FIGS. 27A to 27C are block diagrams which illustrate exemplary methods for changing a sub-gateway due to an occurrence of a failure.

FIGS. 27A to 27C are block diagrams which illustrate exemplary methods for changing a sub-gateway due to an occurrence of a failure. In an initial state, the node N3 has been set as a leader node, and a master sub-gateway and a slave sub-gateway have been set as illustrated in FIG. 27A. FIGS. 28A to 28C illustrate exemplary master cluster tables 61 held by the nodes N3 to N5 in the state of FIG. 27A. FIG. 28A illustrates an exemplary master cluster table 61 of the node N4, FIG. 28B of the node N5, and FIG. 28C of the node N3.

After that, a failure occurs in the node N8, as illustrated in FIG. 27B. The node N8 stops transmitting a hello frame. The node N4 decrements the value of the TTL for the node N8 by one at regular time intervals when it becomes impossible to receive a hello frame from the node N8. The node N4 determines that a failure has occurred in the node N8 when the value of the TTL becomes 0. The node N4 has no adjacent node in the cluster C7 except for the node N8. Accordingly, the node N4 determines that it is no longer adjacent to the cluster C7, and deletes the entry for the cluster C7 from the master cluster table 61. As a result of the processing, the master cluster table 61 of the node N4 becomes as illustrated in FIG. 29A.

When the entry for the cluster C7 is no longer in the master cluster table 61 provided with the node N4, the node N4 does not include an MCI entry for the cluster C7 in a hello frame which it generates. Accordingly, it is not possible for the node N3 to receive the MCI entry for the cluster C7 from the node N4. The master-table updating unit 33 of the node N3 decrements the TTL of a master sub-gateway at regular time intervals because the MCI entry for the cluster C7 is not transmitted from the node N4 that is a master sub-gateway of the cluster C7. The node N3 determines that the node N4 is not adjacent to the cluster C7 when the TTL of a master sub-gateway becomes 0. The sub-gateway selector 42 of the node N3 sets the node N3 as a master sub-gateway used for a communication with the cluster C7. Further, the relay-destination determining unit 43 of the node N3 sets the node N6 as a slave sub-gateway because the node N3 has been set as a master sub-gateway. As a result of the processing, the sub-gateway is changed as illustrated in FIG. 27C. Further, the master cluster table 61 provided with the node N3 is updated as illustrated in FIG. 29B.

After changing the sub-gateway as illustrated in FIG. 27C, the node N3 transmits a hello frame to an adjacent node to report that a master sub-gateway is the node N3 and a slave sub-gateway is the node N6. Accordingly, in the node N5 that has received the hello frame from the node N3, the master cluster table is changed from the state of FIG. 28B to the state as illustrated in FIG. 29C.

Figure 30:
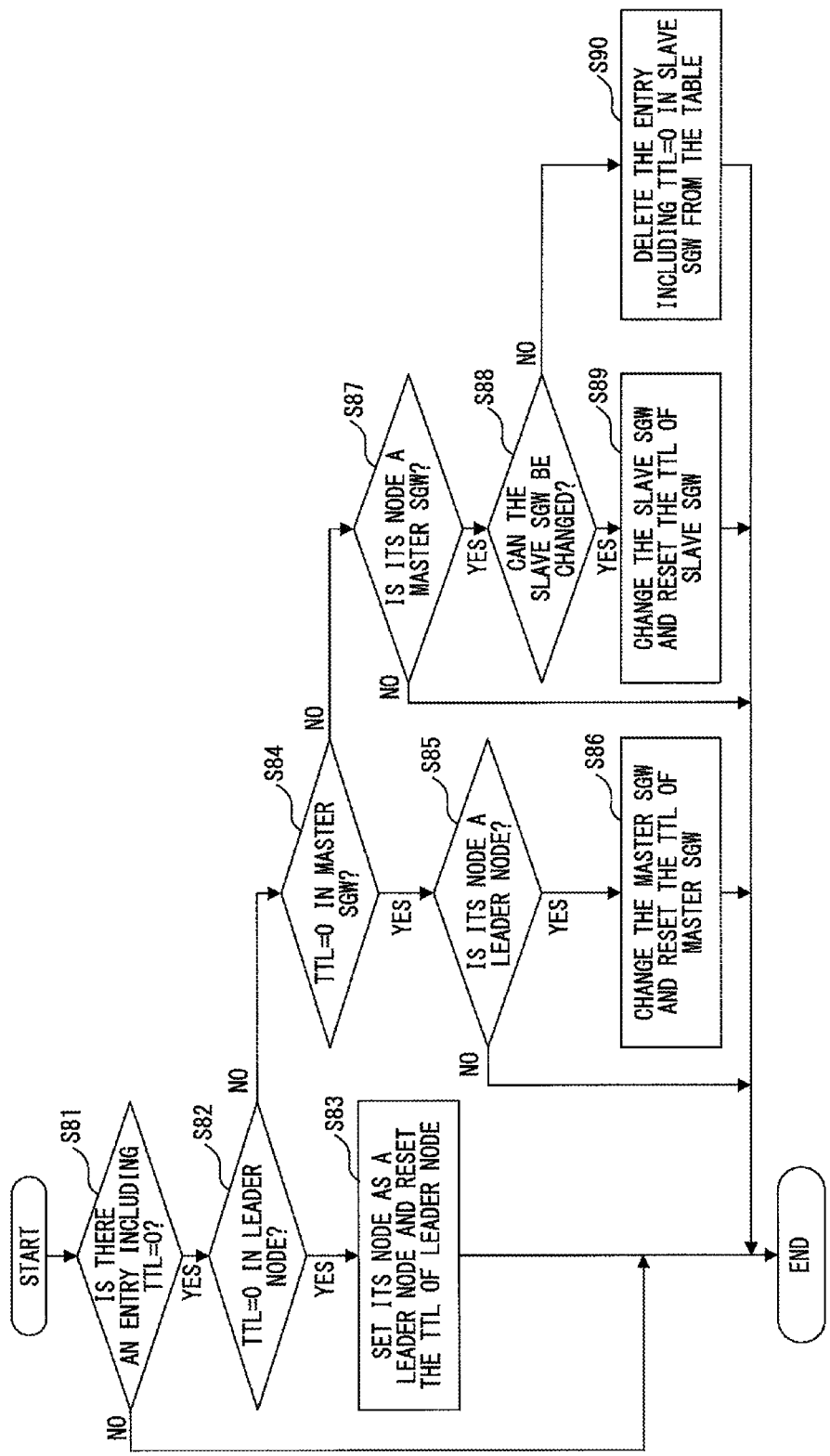
FIG. 30 is a flowchart which illustrates exemplary processing performed by a boundary node in a master cluster when a failure has occurred.

FIG. 30 is a flowchart which illustrates exemplary processing performed by a boundary node in a master cluster when a failure has occurred. When determining that there is an entry including TTL=0, a node device 10 determines whether it is TTL=0 in the leader node (Yes at Step S81, Step S82). When it is TTL=0 in the leader node, the leader-node determining unit 41 sets its node as a leader node, and resets the value of the TTL of the leader node (Yes at Step S82, Step S83). When it is not TTL=0 in the leader node, the node device 10 determines whether the TTL for a master sub-gateway is 0 (No at Step S82, Step S84). When the TTL for a master sub-gateway is 0, the sub-gateway selector 42 determines whether its node is a leader node (Yes at Step S84, Step S85). When its node is not a leader node, the sub-gateway selector 42 ends the processing (No at Step S85). On the other hand, when its node is a leader node, the sub-gateway selector 42 changes the master sub-gateway and resets the value of the TTL (Yes at Step S85, Step S86).

At Step S84, when the TTL for a master sub-gateway is not 0, the relay-destination determining unit 43 determines that a failure has occurred in the slave sub-gateway (No at Step S84). Accordingly, the relay-destination determining unit 43 determines whether its node is a master sub-gateway (Step S87). When its node is not a master sub-gateway, the processing ends (No at Step S87). When its node is a master sub-gateway, it determines whether it is possible to change the slave sub-gateway (Yes at Step S87, Step S88). When it is possible to change the slave sub-gateway, the relay-destination determining unit 43 determines a new slave sub-gateway, and resets the value of the TTL (Yes at Step S88, Step S89). When it is not possible to change the slave sub-gateway, the relay-destination determining unit 43 deletes the entry including TTL=0 (No at Step S88, Step S90).

Figure 31:
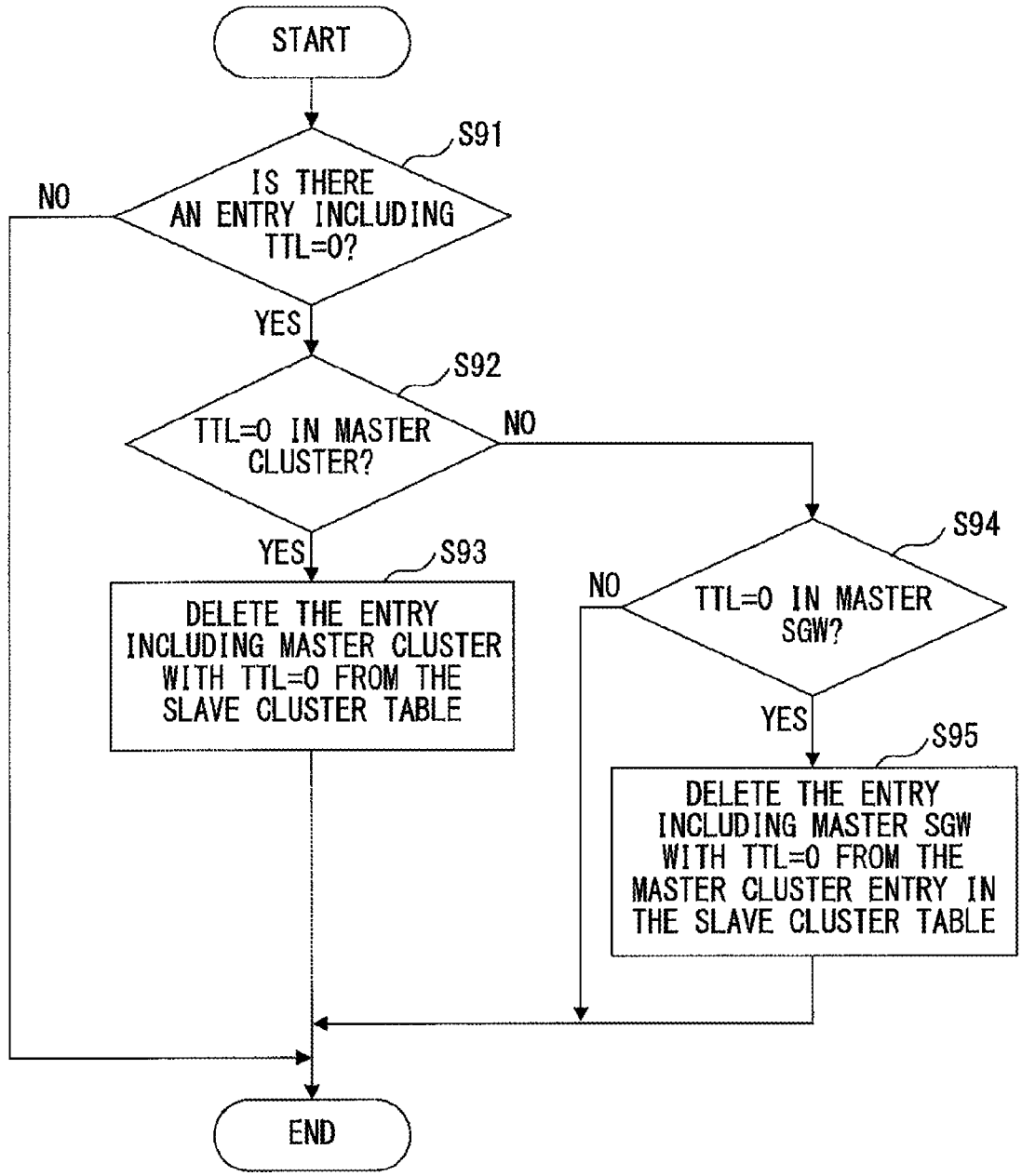
FIG. 31 is a flowchart which illustrates exemplary processing performed by a boundary node in a slave cluster when a failure has occurred.

FIG. 31 is a flowchart which illustrates exemplary processing performed by a boundary node in a slave cluster when a failure has occurred. When determining that there is an entry including TTL=0, the slave-table updating unit 32 determines whether the TTL of a master cluster is 0 (Yes at Step S91, Step S92). When the TTL of a master cluster is 0, the slave-table updating unit 32 deletes the entry including a master cluster with TTL=0 from the slave cluster table 62 (Yes at Step S92, Step S93). When the TTL of a master cluster is not 0, it determines whether the TTL of a master sub-gateway is 0 (No at Step S92, Step S94). When the TTL of a master sub-gateway is not 0, the slave-table updating unit 32 ends the processing (No at Step S94). When the TTL of a master sub-gateway is 0, the slave-table updating unit 32 deletes the entry including a master sub-gateway with TTL=0 from the slave cluster table 62 (Yes at Step S94, Step S95).

Figure 32B:
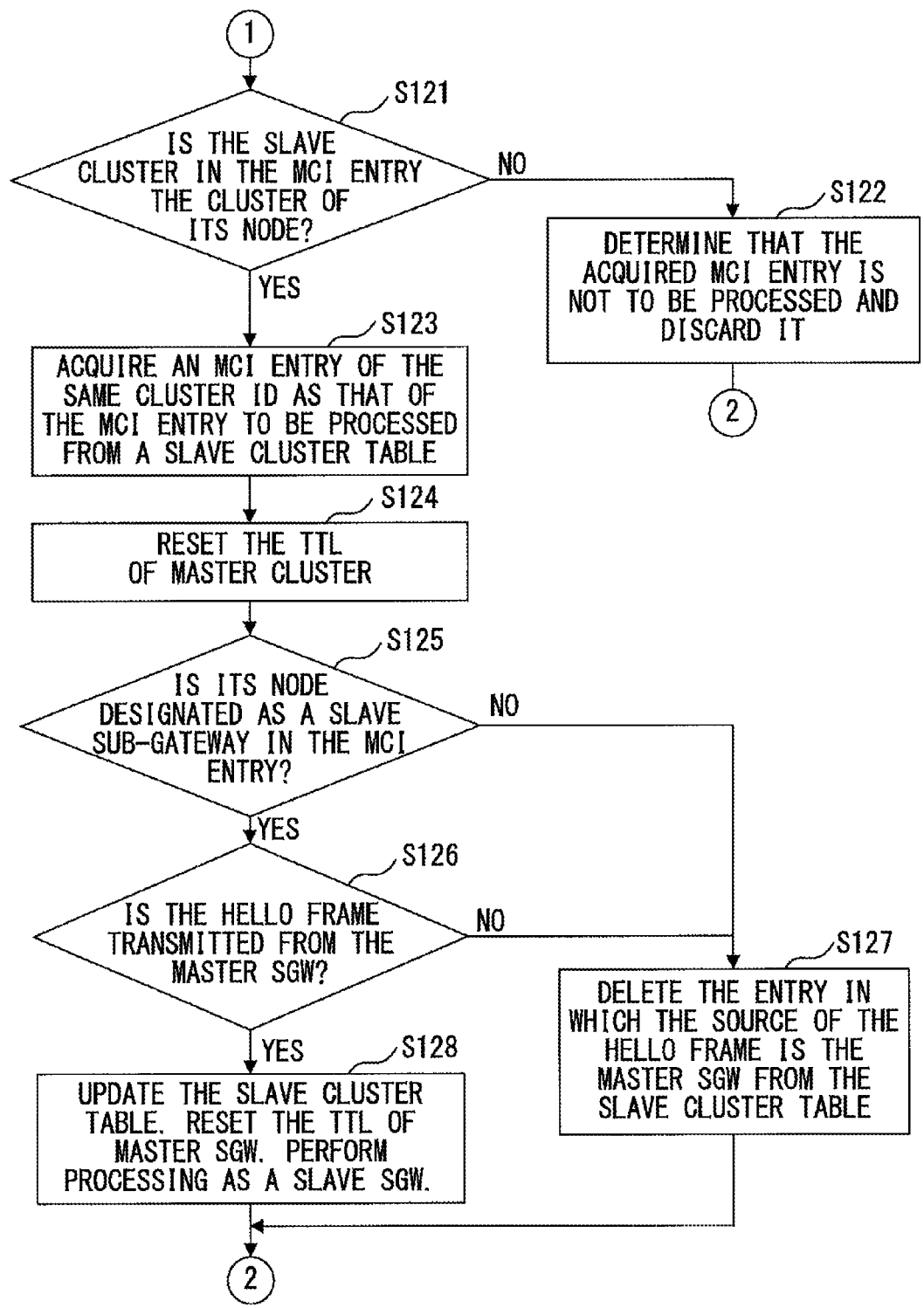
FIG. 32B is a flowchart which illustrates exemplary processing of master cluster information according to the second embodiment.

FIGS. 32A and 32B are a set of flowcharts which illustrate exemplary processing of master cluster information according to the second embodiment. Steps S101 to S107 are similar to Steps S11 to S17 described with reference to FIG. 21A. When the reported leader node does not have a better condition than the present leader node, the master-table updating unit 33 determines whether the sequence number SN of a leader node in a hello frame has been updated (No at Step S107, Step S108). When the sequence number of a leader node in the hello frame has been updated, the master-table updating unit 33 resets the value of the TTL of a leader node (Yes at Step S108, Step S109). Further, the master-table updating unit 33 updates the sequence number of a leader node. On the other hand, when the reported leader node has a better condition than the present leader node, the master-table updating unit 33 changes the leader node (Yes at Step S107, Step S110). Further, the master-table updating unit 33 resets the TTL of a leader node, and updates the sequence number (Step S111). When it has been determined to be No at Step S108, or after the processes of Steps S109 and S111, the master sub-gateway is updated by the process of Step S112. Step S112 will be described below. After that, the TTL of a master sub-gateway is reset (Step S113). Further, n is incremented by one, and the processes of and after Step S103 repeat (Step S114).

Steps S121 to S123 in FIG. 32B are similar to Steps S31 to S33 described with reference to FIG. 21B. After the process of Step S123, the slave-table updating unit 32 resets the TTL of a master cluster for an entry of the slave cluster table 62 that corresponds to MCI to be processed (Step S124). The processes of Steps S125 to S127 are similar to Steps S34 to S36 described with reference to FIG. 21B. When it is determined to be Yes at Step S126, the slave-table updating unit 32 sets its node as a slave sub-gateway. Further, the slave-table updating unit 32 resets the TTL of a master sub-gateway in the slave cluster table 62 (Step S128).

Figure 33:
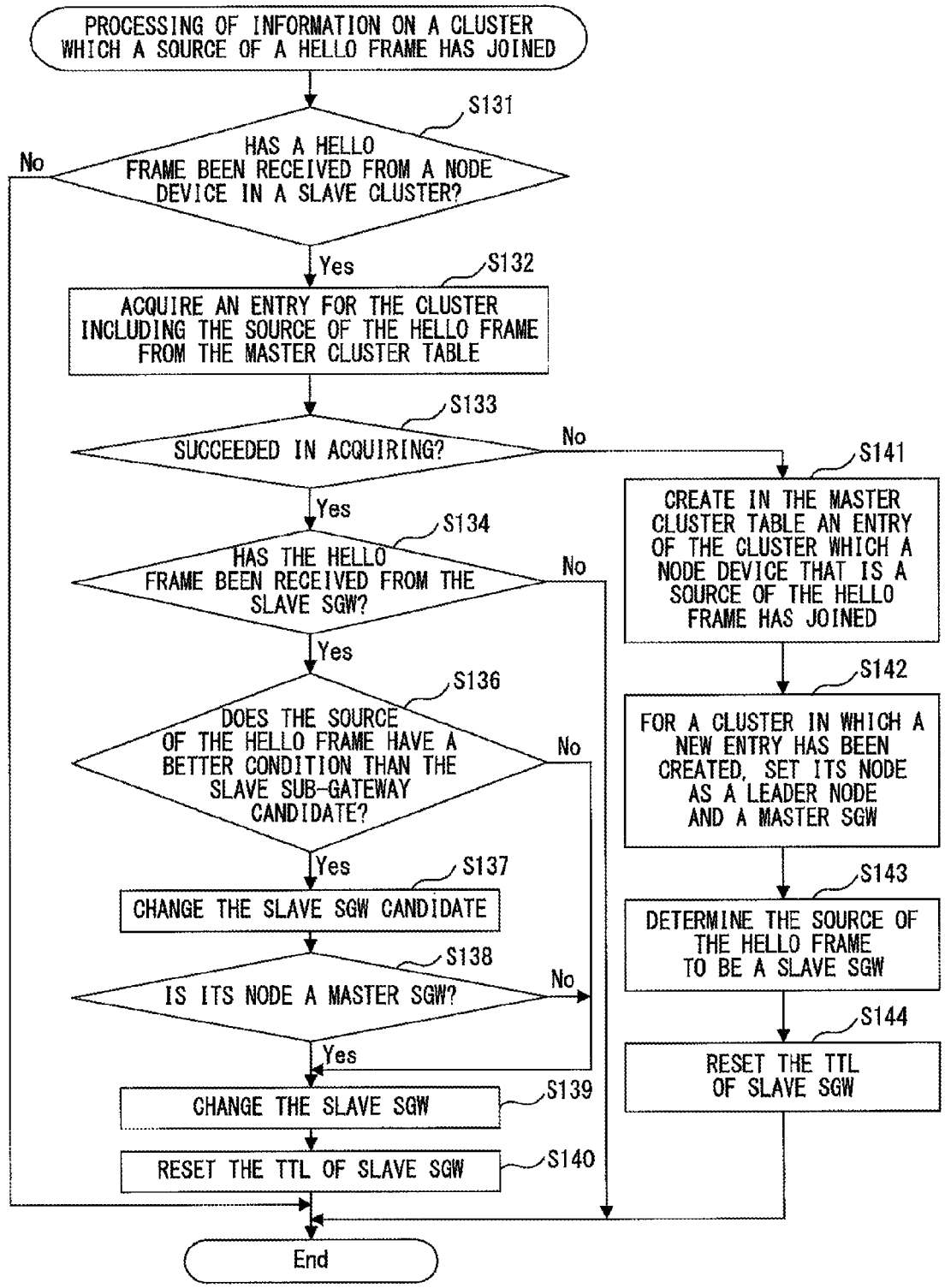
FIG. 33 is a flowchart which illustrates exemplary processing of information on a cluster which a source of a hello frame has joined.

FIG. 33 is a flowchart which illustrates exemplary processing of information on a cluster which a source of a hello frame has joined. Steps S131 to S133 are similar to Steps S41 to S43 described with reference to FIG. 22. When it succeeds in acquiring an entry from the master cluster table 61, the master-table updating unit 33 determines whether the source of the hello frame is a slave sub-gateway (Yes at Step S133, Step S134). When the source of the hello frame is not a slave sub-gateway, the master-table updating unit 33 ends the processing (Yes at Step S134, Step S135). The processes of Steps S136 to S139 are similar to those of Steps S44 to S47 described with reference to FIG. 22. After that, the relay-destination determining unit 43 resets the TTL of a slave sub-gateway (Step S140). Also when it has been determined to be No at Steps S136 and S138, the process of Step S140 is performed. The processes of Steps S141 to S143 are similar to those of Steps S48 to S50 described with reference to FIG. 22. After that, the relay-destination determining unit 43 resets the TTL of a slave sub-gateway (Step S144).

As described above, the setting of a sub-gateway is autonomously changed if a failure has occurred in a node device 10 that operates as a sub-gateway according to the second embodiment. Further, this embodiment provides a similar advantage to the first embodiment.

As described above, the above embodiments including the first and second embodiments permit improving of an efficiency of a communication between clusters.

<Others>

The embodiments including the first and second embodiments are not limited to the above-mentioned application, and various modifications may be made thereto. Some other examples will be described below.

In the example mentioned above, a case in which one cluster serves as a master cluster or a slave cluster has been described for ease in understanding. However, one cluster may serve as a master cluster for a certain cluster and as a slave cluster for another cluster. For example, a cluster C2 is adjacent to both clusters C1 and C3. In this case, the cluster C2 serves as a slave cluster when selecting a sub-gateway used for a communication with the cluster C1, but serves as a master cluster when selecting a sub-gateway used for a communication with the cluster C3.

Information elements included in a hello frame may be added depending on implementation. As described above, the setting of a sub-gateway may be made by use of a control frame other than a hello frame. Further, information elements included in master cluster tables 53 and 61 or in slave cluster tables 54 and 62 may be changed depending on implementation.

The above embodiments including the first and second embodiments may be applicable to a case in which a cluster is dynamically formed according to an increase or decrease in node device 10 and to a case in which a cluster is fixedly determined.

Further, a condition of selecting a leader node or a sub-gateway may be changed depending on implementation. For example, a node device 10 having a node ID including a larger number may be more likely to be set as a leader node. Likewise, a condition may be set so that a node device 10 having a node ID including a larger number may be more likely to be selected as a sub-gateway.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication method comprising:
    performing, with a node device adjacent to a selection device, transmission and reception of a report frame that reports an identifier of a node device included in a first group, the performing being performed by the selection device, the selection device being selected from the first group that is located in a first cluster and is a group of node devices capable of directly communicating with a node device in a second cluster adjacent to the first cluster without intervention of any other node devices;
    selecting, by the selection device, from among the first group a first relay device that relays a relay frame used for a communication between a node device in the first cluster and a node device in the second cluster; and
    determining, from among the node devices included in a second group, a node device adjacent to the first relay device to be a second relay device that relays the relay frame to a node device in the second cluster, the second group being located in the second cluster and being a group of node devices capable of communicating with a node device in the first cluster, the determining being performed by the first relay device, wherein
    a first node device set as the first relay device monitors whether a failure has occurred in a fourth node device that operates as the second relay device,
    when the first node device is no longer included in the first group due to a failure occurring in the fourth node device, the first node device reports to the selection device that the first node device is not capable of communicating with the second cluster, and
    the selection device selects a second node device in the first group and sets the second node device as the first relay device.

2. The communication method according to claim 1, wherein
    a node device included in the first group reports, by use of the report frame, a target node device in which the number of clusters with which it is capable of communicating is largest among the node devices in the first group, to the selection device, and
    the selection device selects, as the first relay device, the target node device.

3. The communication method according to claim 1, wherein
    a node device included in the second group reports the number of clusters with which it is capable of communicating, to an adjacent node device, and
    the first relay device determines, to be the second relay device, a node device in which the number of clusters with which it is capable of communicating is largest among the node devices included in the second group and adjacent to the first relay device.

4. The communication method according to claim 1, comprising:
    acquiring, by use of the report frame, the number of clusters with which a second node device in the first group is capable of communicating after selecting a first node device included in the first group as the first relay device; and
    changing the relay device from the first node device to the second node device when determining that the number of clusters with which the second node device is capable of communicating is greater than the number of clusters with which the first node device is capable of communicating.

5. The communication method according to claim 4, wherein
    the second node device requests that a third node device that is included in the second group and adjacent to the second node device operate as the second relay device when the first relay device is changed from the first node device to the second node device,
    the third node device starts relaying the relay frame in response to the request of the second node device, and
    a fourth node device determined to be the second relay device by the first node device ends the relay of the relay frame when it is reported by the first node device that the third node device has been set as the second relay device.

6. The communication method according to claim 1, wherein
    the first relay device
        acquires, from a fifth node device adjacent to the first relay device in the second group, the number of clusters with which the fifth node device is capable of communicating after determining a fourth node device included in the second group to be the second relay device, and
        changes the second relay device from the fourth node device to the fifth node device when it determines that the number of clusters with which the fifth node device is capable of communicating is greater than the number of clusters with which the fourth node device is capable of communicating.

7. The communication method according to claim 1, wherein
    the selection device monitors whether a failure has occurred in a first node device selected as the first relay device, and
    when it is not possible to relay the relay frame from the first node device to a node device in the second cluster due to a failure occurring in the first node device, the selection device selects a second node device in the first group and sets the second node device as the first relay device.

8. A communication method comprising:
performing, with a node device adjacent to a selection device, transmission and reception of a report frame that reports an identifier of a node device included in a first group, the performing being performed by the selection device, the selection device being selected from the first group that is located in a first cluster and is a group of node devices capable of directly communicating with a node device in a second cluster adjacent to the first cluster without intervention of any other node devices;
selecting, by the selection device, from among the first group a first relay device that relays a relay frame used for a communication between a node device in the first cluster and a node device in the second cluster; and
determining, from among the node devices included in a second group, a node device adjacent to the first relay device to be a second relay device that relays the relay frame to a node device in the second cluster, the second group being located in the second cluster and being a group of node devices capable of communicating with a node device in the first cluster, the determining being performed by the first relay device, wherein
a first node device set as the first relay device monitors whether a failure has occurred in a fourth node device that operates as the second relay device,
when the first node device is no longer included in the first group due to a failure occurring in the fourth node device, the first node device reports to a node device adjacent to the first node device that the first node device is not capable of communicating with the second cluster,
a node device in the first group that is adjacent to the first node device reports to adjacent node devices that they have become a candidate device that is a candidate for the first relay device, and
the selection device selects the first relay device from among the candidate devices.

9. A non-transitory computer-readable recording medium having stored therein a program for causing a node device in a first cluster to execute a process comprising:
receiving a frame from an adjacent node device that is adjacent;
determining, from among a first group that is located in a first cluster and is a group of node devices capable of directly communicating with a node device in a second cluster adjacent to the first cluster without intervention of any other node devices, a selection device that selects from the first group a first relay device that relays a communication between a node device in the first cluster and a node device in the second cluster;
when selected as the first rely device by the selection device, determining an adjacent node device located in the second cluster to be a second relay device used for relaying a relay frame relayed from the first cluster to the second cluster;
transmitting to the adjacent node device a report frame used to report information to identify a node device that has been determined to be the second relay device; and
when selected as the first relay device,
determining whether the first relay device is no longer a node device adjacent to the second cluster when a failure has occurred in the node device determined to be the second relay device, and
reporting to the selection device that the first relay device is not adjacent to the second cluster when the first relay device is no longer a node device that is adjacent to a node device in the second cluster.

10. The recording medium according to claim 9 that has stored therein the program for causing the node device in the first cluster to further execute a process comprising
including in the report frame information to identify the node device determined to be the first relay device.

11. The recording medium according to claim 10 that has stored therein the program for causing the node device in the first cluster to further execute a process comprising:
when set as the selection device,
selecting, as the first relay device, a node device in which the number of clusters with which it is capable of communicating is largest among the node devices in the first group; and
when a node device in which the number of clusters with which it is capable of communicating is greater than a node device that has been set as the first relay device is reported, changing the first relay device by selecting the reported node device as the first relay device.

12. The recording medium according to claim 9 that has stored therein the program for causing the node device in the first cluster to further execute a process comprising:
when selected as the first relay device,
determining, to be the second relay device, a node device in which the number of clusters with which it is capable of communicating is largest among the node devices that are located in the second cluster, that are included in a second group that is a group of node devices capable of communicating with a node device in the first cluster, and that are adjacent to the first relay device; and
when a node device in which the number of clusters with which it is capable of communicating is greater than the node device that has been determined to be the second relay device is reported, changing the second relay device by selecting the reported node device as the second relay device.

13. A node device comprising:
a receiver configured to receive a frame from an adjacent node device that is adjacent;
a processor configured to determine, from among a first group that is located in a first cluster and is a group of node devices capable of directly communicating with a node device in a second cluster adjacent to the first cluster without intervention of any other node devices, a selection device that selects from the first group a first relay device that relays a communication between a node device in the first cluster and a node device in the second cluster, and when selected as the first relay device by the selection device, determining, to be an adjacent node device located in the second cluster, a second relay device used for a relay of a relay frame relayed from the first cluster to the second cluster; and
a transmitter configured to transmit to the adjacent node device a report frame used to report information to identify a node device that has been determined to be the second relay device, wherein
a processor of a node device operating as the first relay device
determines whether the first relay device is no longer a node device adjacent to the second cluster when a failure has occurred in the node device determined to be the second relay device, and
includes in the report frame the information indicating that the first relay device is no longer adjacent to a node device in the second cluster when the first relay device is no longer a node device that is adjacent to a node device in the second cluster.

14. The node device according to claim 13, wherein
the processor
includes in the report frame information to identify the node device determined to be the first relay device.

15. The node device according to claim 14, wherein
a processor of a node device operating as the selection device
selects, as the first relay device, a node device in which the number of clusters with which it is capable of communicating is largest among the node devices in the first group, and
changes the first relay device by selecting a reported node device as the first relay device when a node device in which the number of clusters with which it is capable of communicating is greater than a node device that has been set as the first relay device is reported.

16. The node device according to claim 13, wherein
a processor of a node device operating as the first relay device
determines, to be the second relay device, a node device in which the number of clusters with which it is capable of communicating is largest among the node devices that are located in the second cluster, that are included in a second group that is a group of node devices capable of communicating with a node device in the first cluster, and that are adjacent to the first relay device, and
changes the second relay device by selecting a reported node device as the second relay device when a node device in which the number of clusters with which it is capable of communicating is greater than the node device that has been determined to be the second relay device is reported.

* * * * *